United States Patent
Laux et al.

(10) Patent No.: US 10,161,089 B2
(45) Date of Patent: Dec. 25, 2018

(54) METHOD FOR DISMOUNTING AND MOUNTING OR CHANGING A MILLING UNIT OF A CENTER ROTOR TYPE MILLING MACHINE, CENTER ROTOR TYPE MILLING MACHINE COMPRISING A DISMOUNTABLE AND MOUNTABLE MILLING UNIT, AND TRANSPORT UNIT FOR A MILLING UNIT

(71) Applicant: BOMAG GmbH, Boppard (DE)

(72) Inventors: Robert Laux, Neuwied (DE); Jonathan Stahl, Urmitz (DE); Michele Orefice, Koblenz (DE); Rafael Schomaker, Lingen (DE); Joachim Ponstein, Gondershausen (DE)

(73) Assignee: BOMAG GmbH, Boppard (DE)

( * ) Notice: Subject to any disclaimer, the term of this patent is extended or adjusted under 35 U.S.C. 154(b) by 0 days.

(21) Appl. No.: 15/343,481

(22) Filed: Nov. 4, 2016

(65) Prior Publication Data

US 2017/0130407 A1 May 11, 2017

(30) Foreign Application Priority Data

Nov. 6, 2015 (DE) .......... 10 2015 014 355
Dec. 21, 2015 (DE) .......... 10 2015 016 620

(51) Int. Cl.
*E01C 23/088* (2006.01)
*B62D 65/02* (2006.01)
(Continued)

(52) U.S. Cl.
CPC ............ *E01C 23/088* (2013.01); *B62D 65/02* (2013.01); *B65D 19/38* (2013.01); *E01C 23/127* (2013.01)

(58) Field of Classification Search
CPC ..... E01C 23/088; E01C 23/127; B65D 19/38; B65D 90/18; B65D 88/12; B62D 65/02; B60P 1/483
(Continued)

(56) References Cited

U.S. PATENT DOCUMENTS 5,605,207 A * 2/1997 Betcher ................ B25H 1/0007
187/244
8,424,972 B2 * 4/2013 Berning ................ E01C 23/088
299/1.5
(Continued)

FOREIGN PATENT DOCUMENTS

DE   102011018222 A1   10/2012
DE   102013005594 A1   10/2014
(Continued)

OTHER PUBLICATIONS

German Patent Office, English Machine Translation of DE102013005594A1, published Oct. 9, 2014 (1 page).
(Continued)

*Primary Examiner* — Carib A Oquendo
(74) *Attorney, Agent, or Firm* — Wood Herron & Evans LLP

(57) ABSTRACT

The present invention relates to methods for dismounting and mounting a milling unit of a center rotor type milling machine, to center rotor type milling machines comprising a mountable and dismountable milling unit, as well as to a transport unit.

21 Claims, 14 Drawing Sheets

(51) Int. Cl.
*B65D 19/38* (2006.01)
*E01C 23/12* (2006.01)

(58) Field of Classification Search
USPC .................. 414/468, 469, 539, 589; 29/428
See application file for complete search history.

(56) References Cited

U.S. PATENT DOCUMENTS

| | | | | |
|---|---|---|---|---|
| 8,474,919 | B2* | 7/2013 | Cipriani | E01C 23/088 |
| | | | | 299/39.4 |
| 8,770,668 | B2* | 7/2014 | Hall | E01C 23/088 |
| | | | | 29/426.1 |
| 2004/0156703 | A1* | 8/2004 | Benedikt | B60P 1/6463 |
| | | | | 414/498 |
| 2008/0193210 | A1* | 8/2008 | Beales | E02F 3/3618 |
| | | | | 403/326 |
| 2012/0284989 | A1 | 11/2012 | Busley et al. | |
| 2013/0170941 | A1* | 7/2013 | Drott | B60P 3/41 |
| | | | | 414/809 |
| 2014/0379227 | A1* | 12/2014 | Reuter | E01C 23/088 |
| | | | | 701/50 |
| 2016/0040371 | A1 | 2/2016 | Roetsch et al. | |
| 2016/0040372 | A1* | 2/2016 | Eiden | E01C 23/088 |
| | | | | 29/426.1 |
| 2017/0328018 | A1 | 11/2017 | Mannebach et al. | |

FOREIGN PATENT DOCUMENTS

| | | |
|---|---|---|
| DE | 102013007161 A1 | 10/2014 |
| DE | 102014011856 A1 | 2/2016 |

OTHER PUBLICATIONS

German Patent Office, English Machine Translation of DE102013007161A1, published Oct. 30, 2014 (1 page).

* cited by examiner

METHOD FOR DISMOUNTING AND MOUNTING OR CHANGING A MILLING UNIT OF A CENTER ROTOR TYPE MILLING MACHINE, CENTER ROTOR TYPE MILLING MACHINE COMPRISING A DISMOUNTABLE AND MOUNTABLE MILLING UNIT, AND TRANSPORT UNIT FOR A MILLING UNIT

CROSS-REFERENCE TO RELATED APPLICATIONS

The present application claims priority under 35 U.S.C. § 119 of German Patent Application No. 10 2015 014 355.7, filed Nov. 6, 2015, and German Patent Application No. 10 2015 016 620.4, filed Dec. 21, 2015, the disclosures of which are hereby incorporated herein by reference in their entireties.

FIELD OF THE INVENTION

The present invention relates to a method for dismounting and mounting and/or changing a milling unit of a center rotor type milling machine, to a center rotor type milling machine, and to a transport unit for a milling unit according to the independent claims.

BACKGROUND OF THE INVENTION

Essential elements of a generic center rotor type milling machine are a machine part having a machine frame, an operator platform, a drive engine as well as travelling devices driven by the drive engine, such as wheels and/or crawler tracks. Preferably, all travelling devices are connected to the machine frame via height-adjustable lifting columns so that the distance of the machine frame to the ground in the vertical direction can be adjusted by adjusting the lifting columns. Furthermore, a generic center rotor type milling machine comprises a milling unit having a milling drum for milling ground material and a milling drum box for covering the milling drum to the sides and upward. The milling unit can be detachably fastened to the machine frame in the working direction between the front and the rear travelling devices via a fastening device fastening the milling drum box to the center rotor type milling machine. Such a center rotor type milling machine is known from DE 10 2011 018 222 A1, for example. The invention described therein particularly relates to road milling machines.

Generic center rotor type milling machines are usually used in road and pathway construction. Center rotor type milling machines of the road cold milling machine type are used for milling off a road surface layer for road renewal. Generic center rotor type milling machines are generally also referred to as large-scale milling machines. In these machines, the milling unit is, in a spaced manner, situated in the working direction between the front and the rear travelling devices, normally wheels or crawler tracks, said front or rear travelling devices comprising either a pair of devices or a single device. An essential aspect for the application range of such a center rotor type milling machine is the width of the milling drum arranged on said center rotor type milling machine, the milling drum usually being a hollow-cylindrical unit with a plurality of milling tools being arranged in a known manner on the outer jacket surface of said unit. The milling drum is usually supplied with drive energy by the drive unit of the center rotor type milling machine, for example, via a mechanic or hydraulic drive train. The milling drum rotates inside a milling drum box about a horizontal rotation axis extending transversely to the working direction and mills off ground material when in a state immersed in the ground. Here, the milling drum box relates to a housing-like entirety with the milling drum being arranged therein and protruding toward the ground. The milling drum box prevents milled material from being thrown around in an uncontrolled manner during working operation and additionally provides a compartment for controlled guidance of milled material. In other words, the milling drum box, while being open toward the ground, surrounds the milling drum partially in the horizontal direction and in the vertical direction upwards. It is known to design the milling unit as a demountable entirety, comprising the milling drum and the milling drum box, at the machine part of the center rotor type milling machine. For example, demounting the milling unit may be desired when the center rotor type milling machine is to be lightened, for example, for transport purposes. Working times required for dismounting and mounting the milling unit from/to the machine part are, of course, desired to be as short as possible. Furthermore, there is often a need for being able to mill various milling widths with one and the same center rotor type milling machine. To that end, it is preferred if various milling units can be mounted and quickly exchanged amongst one another on one and the same center rotor type milling machine. In particular, this relates to the use of so-called large-scale milling machines having a milling unit arranged between the front and rear travelling devices. The option of dismounting the milling unit as an entirety from the machine part is described in DE 10 2011 018 222 A1, for example. To that end, the milling drum box is connected to the machine part in a detachable manner via massive fastening screws and corresponding lock nuts. The disadvantage of said configuration lies with the fact that the fastening screws are oftentimes hardly accessible, which is why other parts of the center rotor type milling machine need to be removed first in order to allow access to the fastening screws. Moreover, said screws are comparatively large screws, so that a great force must be applied for mounting and dismounting. This is a challenge particularly in constricted space. Furthermore, in this alternative, time expenditure for the mounting and dismounting or changing of the milling unit is comparatively high as well. When referring to the dismounting and mounting of the milling unit hereinafter, this is to be understood as equally comprising mounting and dismounting one and the same milling unit as well as changing the milling unit, i.e., dismounting a first milling unit and mounting a second milling unit.

SUMMARY OF THE INVENTION

The object of the present invention is to provide a method and a center rotor type milling machine which enable, compared to known prior art approaches, dismounting and mounting the milling unit from or to the machine part or machine frame more rapidly and more simple to an operator so that, for example, the milling unit can be transported separately, so that a permitted maximum transport weight of the center rotor type milling machine excluding the milling unit is no longer exceeded.

The object is achieved, on the one hand, by a method for dismounting and mounting/changing a milling unit of a center rotor type milling machine, comprising the steps for dismounting the milling unit:

a) positioning the center rotor type milling machine in an exchange position of the center rotor type milling machine with the height-adjustable lifting columns extended in a transport adjustment position;

b) further lifting a machine frame of the center rotor type milling machine carrying a milling unit by extending the lifting columns being in the transport adjustment position into an exchange adjustment position;

c) positioning a transport unit relative to the center rotor type milling machine with the milling unit;

d) placing the milling unit on the transport unit, in particular, by lowering the milling unit by retracting the lifting columns from the exchange adjustment position until the milling unit rests on the transport unit, and releasing support and functional connections with the machine frame of the center rotor type milling machine;

e) removing the transport unit with the milling unit and, prior to this, preferably extending the lifting columns into an exchange adjustment position;

and/or for mounting the milling unit:

f) extending the lifting columns being in the transport adjustment position into an exchange adjustment position and positioning a transport unit with a milling unit relative to the center rotor type milling machine without milling unit;

g) establishing at least support connections between the milling unit and the center rotor type milling machine (or its machine frame), preferably also functional connections;

h) removing the transport unit; and lowering the machine frame until reaching the transport adjustment position of the lifting columns.

Thus, the exchange position of the center rotor type milling machine relates to a positioning of the entire machine at a location where the exchanging process or the mounting or dismounting process is to be effected. Thus, the exchange position relates to a positioning of the machine in the environment, the latter ideally being horizontally planar. The transport adjustment position of the lifting columns relates to an extension position of the lifting columns for transport operation of the center rotor type milling machine, for example, for maneuvering, travelling to the site of operation, etc. An essential aspect for the transport adjustment position is that sufficient ground clearance is present, in particular, with respect to the milling unit and especially the milling drum arranged in the milling unit, in order to be able to over-travel smaller ground obstacles, for example, milling edges, without any problems. The transport adjustment position is preferably selected such that the milling unit has a ground clearance, i.e., a vertical distance from the ground, of at least 300 mm, in particular, at least 350 mm and more particularly at least 400 mm, for the machine to be able to over-travel milling edges and/or low-loader edges even with mounted milling unit when loading the machine for transport. However, a problematic aspect when extending the lifting columns always lies with the tilt stability of the machine since, due to their design, center rotor type milling machines, in particular, road cold milling machines, inherently have a comparatively high center of mass. The machine must by all means be prevented from tilting over. As a result, the transport adjustment position is selected such that the lower edge of the milling unit is significantly lifted above the ground. At the same time, excessive lifting is preferably avoided in order to avoid, on the one hand, having to increase the total length of the lifting columns more than necessary, and, on the other hand, shifting of the machine's center of mass too far upward. Therefore, the maximum ground clearance in the transport adjustment position, in particular, in relation to the milling unit and especially to the milling drum arranged inside the milling unit, is preferably less than 500 mm, in particular, less than 480 mm and more particularly less than 450 mm. The transport adjustment position, or the arrival at said adjustment position, may, in particular, be set either automatically by a machine control and/or manually by the operator. Often, the transport adjustment position is the maximum extended position allowed by the machine control and/or the design of the lifting columns, although a small upward buffer range, for example, in the single-digit centimeter range, may additionally be provided in such cases in order to enable machine typical pendular functions. One aspect of the present invention lies with the finding that at least for the exchanging process of the milling unit an extension of the lifting columns beyond said transport adjustment position into an exchange adjustment position is possible and permitted. This may cause an undesired overall configuration of the entire machine in terms of the design of the lifting columns and the position of the center of mass of the center rotor type milling machine; however, this is acceptable in view of the little machine movements during the exchanging process. The exchange adjustment position is in this case preferably selected such that the milling unit has a ground clearance, i.e., a vertical distance from the ground, of at least 400 mm, in particular, at least 450 mm, and more particularly at least 500 mm, and, respectively, ideally less than 650 mm, and more particularly less than 600 mm. Arrival at the exchange adjustment position may likewise be achieved manually or, preferably, automatically by means of a machine control. It is further noted that, according to the present invention, the adjustment of the lifting columns for the exchanging process includes simultaneous adjustment of all lifting columns, paired adjustment, in particular, of the front pair and the rear pair of lifting columns viewed in the direction of advance of the center rotor type milling machine, or even individual adjustment of the lifting columns. This applies to all adjustment movements of the lift columns during the adjustment process.

It is important that the machine is initially brought into the exchange position. Said exchange position describes essentially the positioning of the machine in the surroundings for the exchanging process. Since an elevation of the center of mass of the machine is provided for the exchanging process, said exchange position is selected preferably in places where the ground is essentially horizontal and comparatively planar, in order to prevent the machine from tilting over in a reliable manner. To that end, the machine in the transport adjustment position is moved to the respective position.

Now, the lifting columns are further extended from the transport adjustment position, in which the lower edge of the milling unit is already situated above the ground, into its exchange adjustment position in order to produce more ground clearance for the exchanging process of the milling unit, in particular, below the machine frame between the travelling devices. Reference is made to the above explanations with regard to preferred ground clearance ranges. To that end, the lift columns can be extended until reaching almost instable positions, specifically until into the guide surfaces of guide sleeves, for example, so that only a reduced resting or support surface is available. As an exception, this is acceptable for the exchanging process since the machine is only slightly moved during the exchanging process and, if at all, it is moved only very slowly and while standing on an ideally horizontally extending, essentially planar ground.

If the machine is in the exchange adjustment position, there is sufficient ground clearance in order to position a transport unit for receiving the milling unit under the milling unit. To that end, the transport unit and the center rotor type milling machine are aligned relative to one another, preferably the transport unit is slid under the milling unit, in particular, coming from the side of the center rotor type milling machine.

The milling unit is then placed onto the transport device, preferably by a lowering of the milling unit by means of retracting the lifting columns. Here, depending on the design of the milling unit, said lowering may be effected only as far as the transport adjustment position is not yet reached. It may be provided that the center rotor type milling machine, particularly in a self-propelled manner, slightly moves back and/or forth in order to enable exact alignment of the milling unit relative to the transport unit. Once the milling unit is placed on the transport unit, existing support and functional connections are released. For example, this includes the fastening connections of the milling unit to the machine frame of the center rotor type milling machine, supply connections, in particular, hydraulic lines, for example, for driving the height adjustment of the side plates, and drive connections, for example, the belt of a belt drive or also corresponding hydraulic connections in the case of hydraulically driven milling drums.

Subsequently, the transport unit together with the milling unit is removed from the machine, in particular, for example, by pulling out the transport unit with the first milling unit sideward. To that end, it may be provided that the center rotor type milling machine moves back upward to the exchange adjustment position beforehand.

The method according to one embodiment of the present invention comprises the following steps for mounting the milling unit. First, the lifting columns of the center rotor type milling machine, the latter being in the exchange position without milling unit, are extended again into the exchange adjustment position (or, in case of a change of milling units, left in the exchange adjustment position). Furthermore, the transport unit with the milling unit is roughly pre-positioned relative to the center rotor type milling machine for the exchanging process, in particular, for example, by laterally sliding the transport unit under the standing center rotor type milling machine. Here, it is important that in the scope of the present invention, in particular, step f) does not need to directly follow step e) but rather, for example, low-loader transport of the center rotor type milling machine without a milling unit and separately of the milling unit may occur in between. If the milling unit is mounted in another location, the exchange adjustment position of the center rotor type milling machine needs to be changed accordingly. Furthermore, it may be provided between steps e) and f) that the lifting columns are temporarily adjusted into the transport adjustment position in order to enable travelling operation of the center rotor type milling machine without milling unit, for example, to a transport vehicle.

An aspect which is essential for the further procedure is that the comparatively heavy and bulky milling unit is to be positioned relative to the machine frame in a sufficiently exact manner for the existing fastening devices for fastening the milling unit to the machine frame to be capable of engaging. To that end, it may be preferred that the center rotor type milling machine moves in a self-propelled manner, in particular, in or against its direction of advance. Upon sufficiently precise alignment, the lifting columns are retracted until the previously described support connections can be re-established. Here, use can, in particular, also be made of both moving the center rotor type milling machine in self-propelled manner relative to the milling unit in or against the direction of advance and, preferably, lowering, in order to align the milling unit relative to the center rotor type milling machine. Additionally, the functional connections, i.e., connections such as the drive connection, may also be established in this step, or they may also be established in a later step.

Once at least the support connections between the milling unit and the machine frame of the center rotor type milling machine are established, the transport unit may be removed. To that end, the lifting columns can be extended again into the exchange adjustment position, so that the milling unit is lifted off the transport unit, which can then be removed either by movement of the center rotor type milling machine or, preferably, by pulling the transport unit out sideward from below the center rotor type milling machine. The center rotor type milling machine can then be lowered back into the transport adjustment position and be moved to the site of operation with the exchanged milling unit.

An essential advantage of the method described above particularly lies with the saving of time required for dismounting and mounting or changing of the milling unit compared with methods known from the prior art. Furthermore, a comparatively simple and thus cost-effective design may be considered for the transport unit, since it merely has to be suitable for receiving the milling unit and, in particular, need not be height-adjustable per se.

It is thus essential for the method according to one embodiment of the present invention and also for the device according to one embodiment of the present invention that the lifting devices can act along a sufficient lift path. According to the present invention, in relation to the milling drum diameter of the milling unit (specifically the cutting circle diameter), the lifting columns are preferably configured such that their maximum lift path, i.e., their maximum admissible adjustment path from the maximum retracted state to the maximum extended state for reaching the transport adjustment position, corresponds to at least 0.7, in particular, at least 0.75, and, in particular, at least 0.8 times the milling drum diameter. A normal milling drum diameter is, for example, approx. 1000 mm. In contrast, for reaching the exchange adjustment position, the maximum admissible adjustment path preferably corresponds to at least 0.85, in particular, at least 0.87, and more particularly at least 0.88 times the milling drum diameter of the milling unit. Additionally or alternatively, the minimum required and/or maximum admissible lift or displacement paths in the transport adjustment position and the exchange adjustment position are ideally chosen such that for reaching the transport adjustment position they are preferably in the range of a factor of from 2.1 to 2.5 times the maximum milling depth and for reaching the exchange adjustment position they are preferably in the range of a factor of from 2.4 to 2.8 times the maximum milling depth of the milling unit. Due to construction specifications, the maximum milling depth is normally about one third of the milling drum diameter. Further, additionally or alternatively, the ratio of the maximum admissible lift path of the lifting columns for reaching the transport adjustment position and for reaching the exchange adjustment position ideally is at least 1:1.08, in particular, more than 1:1.1. The aforesaid relations illustrate the relationship between the transport adjustment position and the exchange adjustment position and the corresponding configuration of the lifting columns. In this regard, the "maximum admissible lift or displacement path" refers to the maximum displacement path along which the lifting columns can be moved between the maximum retraction and the maximum extension. Safety elements are usually provided which ensure that, in particular, a maximum extension of the lifting column does not exceed a specified value, for example, in order to ensure reliable support stability of the lifting column. To that end, according to the present invention, these safety elements are configured such that they permit a larger displacement path for the exchange adjustment position than for the transport adjustment position. The aforesaid applies to both the method according to the present invention and the center rotor type milling machine according to the present invention.

Generally, once the center rotor type milling machine is in the exchange adjustment position, the milling unit located under the machine frame may also be lifted toward said machine frame, for example, by means of suitable lifting elements on the transport unit. According to the present invention, it is preferred that the machine frame is initially moved upward in step e) and/or h), in particular, into an exchange adjustment position, and in step g) the machine frame of the center rotor type milling machine is initially lowered onto the milling unit. The relative height adjustment of the milling unit relative to the machine frame is thus preferably effected by adjustment of the machine frame between its exchange adjustment position and its transport adjustment position. The advantage particularly is that a separate lifting element on the transport unit can be omitted.

Moving the center rotor type milling machine relative to the transport unit, in particular, in at least one of steps c), e), f) and/or h), is preferably effected by moving the center rotor type milling machine and/or by moving the transport unit. This means that for the present method for relative alignment generally both the transport unit and, additionally or alternatively, the center rotor type milling machine per se can be moved relative to the ground. Here, moving the center rotor type milling machine provides the advantage in that the latter per se already has drive propulsion, resulting in low requirements, in particular, with respect to the functional spectrum of the transport unit.

Specifically, it may be provided that, in particular, in at least one of steps c), e), f) and/or h), and more particularly in at least the steps c) and h), the transport unit is laterally slid under the machine frame of the center rotor type milling machine or pulled out from there. This may be achieved by a drive propulsion of the transport unit, in which case use is preferably made of an external drive vehicle such as a transport vehicle, a wheel bearing, a forklift, etc., in order to keep the design of the transport vehicle as simple as possible.

It is preferred for the method according to the present invention if movement of the center rotor type milling machine, in particular, in the context of steps c) and f), is effected in and against the forward direction of advance of the center rotor type milling machine, in particular, in a self-propelled manner. This allows, in particular, the use of very efficiently acting devices for rough alignment of the relative position of the transport unit/milling unit to the center rotor type milling machine, the use of sliding guides being particularly preferred in this regard, as will be explained in more detail below.

The center rotor type milling machine can preferably still be moved to some degree within the boundaries of its exchange position by means of self-propulsion when the lifting columns are in the exchange adjustment position. This may also be used, for example, in that in at least one of steps c) and/or h) at least a partial over-travelling of the transport unit by the center rotor type milling machine is effected, in which case the placement/extension and removal/retraction of ramps for/of the transport unit for the center rotor type milling machine may also be comprised. This provides the advantage that a "sliding under" of the transport unit can be omitted. However, it is preferred within the scope of the present invention if additional devices or elements such as ramps, etc., can be omitted.

When extending the lifting columns from the transport adjustment position into the exchange adjustment position, preferably an inner part of the lifting column is displaced with a face-sided end into a contact region of an outer part extending in the displacement direction. The contact region between outer part and inner part usually serves to allow for stable support and reliable guidance of the inner part on the outer part. Usually, said contact region, which may be designed continuously or also in sections, limits the maximum extension path of the outer part relative to the inner part. If, as an exception, the inner part is enabled to be displaced further relative to the outer part as described above, the involved forces cannot be transmitted across the entire contact region between said two parts. According to the inventive approach, such a procedure for the exchanging process is acceptable since movement of the center rotor type milling machine is required and possible only to a very limited extent then. This allows lifting the machine frame further than before with the existing lifting columns and thus increasing ground clearance for the mounting and dismounting process. Special lifting columns which are elongated compared to conventional lifting columns can be omitted then.

In order to facilitate the mounting process of the milling unit to the machine frame of the center rotor type milling machine, preferably, alignment of the milling unit relative to the machine frame of the center rotor type milling machine may be effected in step f) and/or g) via at least one alignment device on the milling unit and/or on the center rotor type milling machine, which is preferably done by movement of the center rotor type milling machine in a self-propelled manner, in particular, at least partially in or against the forward direction of advance. Thus, the alignment device assumes the task of facilitating the exact positioning of the milling unit relative to the center rotor type milling machine. To that end, the alignment device is preferably designed such that the milling unit and the machine frame of the center rotor type milling machine come to a partial abutment with one another, in each case via suitable interacting elements, and are brought into the target position, in particular, for establishing the support connection, by means of guide devices, in particular, slide surfaces, by moving one unit relative to the other unit. This provides the advantage that positioning the milling unit in step f), e.g., by sliding the transport unit including the milling unit under the center rotor type milling machine, can be effected in a comparably imprecise manner, and precise alignment can then be effected by the alignment device between the milling unit and the center rotor type milling machine. In particular, time-consuming maneuvering work of the transport unit can be reduced to a minimum as a result, thus achieving substantial streamlining of the entire exchanging process. As will be explained in more detail below, the alignment device may be configured to act in multiple stages and may, in terms of the method, thus comprise initial rough alignment and subsequent fine alignment, in particular, also via respective individual elements of the alignment device.

In order to even further reduce the time required for the exchanging process, establishing the support and/or functional connections in step g) can be effected via a quick coupling system driven by at least one actuator, driven, in particular, in an electric, hydraulic and/or pneumatic manner. In particular, for achieving the support connection, the fastening system disclosed in DE 10 2014 011 856.8 of the same Applicant may be considered. The disclosure of said patent specification is hereby incorporated herein by reference.

Preferably, in step d) a lowering of side plates of the milling unit and/or in step h) a lifting of side plates of the milling unit is provided, preferably by actuation from the center rotor type milling machine via an established functional connection. This prevents an uncontrolled lowering of the side plates.

As already described, in view of the center of mass of the machine being elevated upward during the dismounting and mounting process or when in the exchange adjustment position, it is advantageous if the exchange position, i.e., the place where the milling unit is exchanged, is selected such that the standing surface of the machine is as horizontal and even as possible. Thus, steps a) to i) are preferably performed on a most horizontal standing surface. To that end, the method according to the present invention may also include a step in advance, via which it is ensured that the standing surface of the center rotor type milling machine in the exchange position fulfils the desired requirements. On the one hand, this may be a corresponding measuring of the exchange position, on the other hand, in particular, ascertainment of the angular position of the center rotor type milling machine (lifting columns uniformly extended, and checking to which extent the machine stands on a horizontal planar ground).

To further increase the operational safety of the method according to the present invention, it is further preferred that additional measures be taken in steps b) to d) and e) to i). Said measures comprise, in particular, one or more of the following steps: 1. delimiting the maximum travelling speed of the center rotor type milling machine (in relation to normal operation); 2. delimiting the maximum possible steering angle at the travelling devices (in relation to normal operation); 3. blocking a coupling in the drive train toward the milling unit in the decoupled position to ensure that unintentional coupling cannot occur during the exchanging process. 4. actuating a V-belt tensioner in the drive train toward the milling unit. One or more of said steps may be activated, in particular, by activation of an "exchange mode" on the center rotor type milling machine in order to enable a safe exchanging process. With respect to said "exchange mode", it may additionally be provided in steps d) and/or g) to at least temporarily shut down the main drive engine and to switch over to an auxiliary engine when the functional connections, specifically the drive connections, between the milling unit and the remaining machine are established. Deactivation of the main drive engine, in particular, prevents the drive train toward the milling unit from being put into operation. The auxiliary drive engine, on the other hand, provides a power supply for elements involved in mounting/demounting works on the center rotor type milling machine. This may concern, in particular, a belt tensioner in the drive train. Additionally or alternatively, it may be provided between steps a) and b), as well as in step f), that when an over-lift is desired, i.e., an additional extension to up to the maximum lift path into the exchange adjustment position, and the operator signals a demounting or exchanging process, the driver (manually) or preferably the machine control will deactivate a lift path limitation otherwise limiting the maximum lift path of the lifting columns more strictly than desired for the exchanging process (i.e., to the maximum lift path during normal operation). Upon completion of the mounting/demounting or exchanging process, the lift path limitation is reactivated, again either manually or automatically by the machine control.

Moreover, steps f) and/or g) preferably include the following measures:

a) rough alignment of the milling unit relative to the machine frame with a first alignment unit; and subsequently b) fine alignment of the milling unit relative to the machine frame with a second alignment device.

In the present context, rough alignment relates to alignment movements by means of which the milling unit is aligned relative to the machine frame of the center rotor type milling machine by at most a few decimeters, in particular, few centimeters, relative to one another, and fine alignment particularly relates to alignment movements by means of which the milling unit is aligned relative to the machine frame of the center rotor type milling machine by at most a few centimeters, in particular, at most in the low single-digit range, and, in particular, by a few millimeters, relative to one another. Here, rough alignment particularly comprises compensation of transversal offset, i.e., an offset of the milling unit relative to the center rotor type milling machine in the horizontal plane and perpendicular, or transversely, to the forward direction of advance, or the longitudinal extension of the center rotor type milling machine, in the range of at most +/−150 mm, in particular, +/−100 mm and more particularly in the range of +/−50 mm with respect to the final position. Furthermore, rotational position deviations, i.e., rotations of the milling unit in the horizontal plane relative to the final position by at most +/−10°, in particular, +/−7°, and more particularly +/−4°, are also corrected by the alignment device for rough alignment. In contrast, the alignment device for fine alignment compensates deviations in the horizontal plane of at most +/−30 mm, in particular, +/−20 mm, and more particularly +/−10 mm, with respect to the final position, and thus concerns final alignment. A gradation of the alignment steps via individual alignment devices is advantageous in that a particularly efficient and reliable guiding of the two elements—milling unit and center rotor type milling machine—toward their desired final relative position is possible, so that damage and wear to the fastening devices, for example, holding pins, lever elements, etc., can be reduced. Furthermore, it is possible to start with only a very imprecise placing of the milling unit relative to the center rotor type milling machine at the beginning of the mounting process, so that time-consuming maneuvering works, in particular, with the transport unit, can be avoided.

The two alignment devices are preferably designed such that when moving one element (e.g., the center rotor type milling machine without the milling unit), said devices guide the relative position of the two elements towards one another or to a desired relative position. Through the movement of one element, the other element can thus also be moved, or movement of one element causes movement, in particular, partially different movement, of the respective other element. Generally, for driving a movement of an element, an external drive such as an external vehicle, e.g., a forklift, etc., may be considered, although the use of the drive propulsion of the center rotor type milling machine and/or the height adjustment drive of the lifting columns is preferred. In step a), the center rotor type milling machine is moved in a guided manner, particularly preferably relative to the milling unit in and against the forward direction of advance, in particular, along wedge surfaces extending horizontally inclined to the longitudinal axis of the center rotor type milling machine, and in step b) the center rotor type milling machine is particularly preferably vertically adjusted relative to the milling unit, in particular, the machine frame of the center rotor type milling machine is lowered onto the milling unit, specifically along conical wedge surfaces with vertically extending longitudinal axes. Thus, each of the alignment steps "rough alignment" and "fine alignment" is assigned a distinct drive. This allows for particularly reliable separation of said two steps and at the same time allows a particularly efficient mounting of the milling unit, since reaching the desired final relative positions of the milling unit relative to the center rotor type milling machine is enabled in a reliable manner.

The present invention also relates to a center rotor type milling machine, comprising a machine frame, a drive engine, travelling devices driven by the drive engine, said travelling devices being connected to the machine frame via height-adjustable lifting columns, and a milling unit with a milling drum for milling off ground material and a milling drum box for covering the milling drum toward the sides and upwards, wherein the milling unit is fastened or can be fastened in a detachable manner to the machine frame of the center rotor type milling machine via a fastening device. The center rotor type milling machine is configured for carrying out the method according to the present invention. A control unit is preferably present, which is designed such that it comprises a milling unit mounting and dismounting mode or an exchange mode, in which it controls extending of the lifting columns beyond a transport adjustment position and into an exchange adjustment position. Reference is made to the above explanations with respect to the meaning of the terms transport adjustment position and exchange adjustment position. Preferably, the center rotor type milling machine and the lifting columns are designed such that the maximum height of the entire machine is at most 3 meters when the lifting columns are in the transport adjustment position. For adjustment into the exchange adjustment position, the maximum height of the center rotor type milling machine can thus be adjusted beyond said three meters. Furthermore, the range of the "over-lift", i.e., the height difference between the transport adjustment position and the exchange adjustment position, is in the range of at least 8 cm, in particular, at least 10 cm, in order to achieve a sufficient ground clearance. With respect to the preferred configuration of the lifting columns in terms of ground clearance and lift path, in particular, for the transport adjustment position and the exchange adjustment position, reference is made to the above explanations regarding the method according to the present invention. Thus, it is important that the control unit enables extension of the lifting columns beyond the transport adjustment position. To that end, elongated lifting columns and lifting columns with an elongated lift path, respectively, compared to the lifting columns usually used so far may be considered, for example. However, it is preferred if the currently known lifting columns are extended further than usual and previously admissible, and this is compensated by ensuring that the center rotor type milling machine stands on an even ground and cannot, or only to a very limited extent, travel with the lifting columns being in said adjustment position.

Therefore, the control unit is preferably designed in such a way that it allows only a limited travelling operation, in particular, with respect to a maximum travelling speed of the center rotor type milling machine and/or a maximum travelling distance of the center rotor type milling machine, when in the milling unit mounting and dismounting mode or exchange mode. In other words, the control unit blocks the normal travelling function of the center rotor type milling machine when the lifting columns are in an adjustment position extended beyond the transport adjustment position, i.e., in an exchange adjustment position. The tilt stability, which is deteriorated by the elevated center of mass of the machine, can be accepted for this situation, i.e., mounting and dismounting of the milling unit.

In addition, it may be provided that a position and/or tilt sensor is present, which transmits information with respect to the tilt stability of the center rotor type milling machine to the control unit during the milling unit mounting and dismounting mode or exchange mode, and a safety function controlled by the control unit may be present which is triggered when reaching predetermined thresholds, in particular, an alarm function, a machine stop, etc. Of course, threshold values may be defined which when reached first result in a warning to be displayed to the operator, e.g., acoustic and/or optical indicators, and which triggers counter measures, e.g., the above mentioned machine stop function, only upon reaching another threshold value.

The structure of the lifting columns may generally vary. Preferably, the lifting columns each have an inner part and an outer part, which can be displaced relative to one another in a manner contacting each other and abut one another in a contact region, the control unit being designed such that, in particular, exclusively, in the exchange mode the inner part can be displaced with its face-sided end into the contact region. The contact region essentially has a guide and force transmission function. It is thus also important that it has at least a certain vertical extension in order to allow a stable lift adjustment and support. The contact region is preferably designed particularly as a cylindrical contact surface essentially surrounding the lift axis between the outer part and the inner part. However, in view of friction forces, it is also preferred to avoid forming the contact region too extensive. Usual dimensions of the contact region, which preferably extends continuously in the axial direction, are in the range of at least 30 cm, preferably at least 40 cm, however preferably a maximum of 100 cm, preferably a maximum of 80 cm and particularly preferably a maximum of 50 cm, in the direction of the adjustment axis between the inner and outer parts. According to the present invention, it is now preferred if the inner part can be slid into the contact region with its face-sided end by at least 8 cm, preferably by at least 10 cm. Transitionally and limited to the exchanging process, a decrease of the actual contact of the inner part to the outer part by at most 30% is thus preferably effected by at most 20%. Then, support between the outer part and the inner part is still sufficiently stable to avoid jeopardizing the support stability of the lifting column, in particular, if it is ensured, specifically by the control unit, that fast and extensive travelling operations of the center rotor type milling machine do not occur in this state. The current displacement position between the inner part and the outer part is thus preferably monitored, for example, by suitable sensors, such as capacitive sensors, cable pull sensors or also suitable optical sensors.

Often times, a lubrication groove is present in the contact region between the outer part and the inner part, preferably at the outer part, via which lubrication groove a lubricant can be introduced into the contact region between the inner part and the outer part. It is preferred when the control unit is designed such that it allows a maximum displacement of the face-sided inner part into the contact region until just before the lubrication groove and not beyond the lubrication groove. This ensures that the lubrication groove is not exposed even when the lifting column is extended into the exchange adjustment position.

A first and a second alignment device are preferably present, which are designed for alignment of the released milling unit relative to the machine frame for fastening the milling unit to the machine frame, said first and second alignment devices ideally being configured differently. The two alignment devices thus each preferably comprise different elements causing the alignment of the milling unit relative to the center rotor type milling machine without milling unit. As a result, this enables designing the achieved extent of alignment or the possible scope of alignment in a graduated manner, whereby, in particular, wear of fastening means and also the time required for the mounting process can be reduced.

In this regard, the first and the second alignment device ideally have elements each at the milling unit and at the machine frame, which are designed such that they get into contact or abutment with one another during the alignment process. Such elements may, on the one hand, be elements protruding particularly in the vertical direction, such as abutment blocks, bolts, pins, etc., and receiving elements such as depressions, boreholes, slide devices such as inclined slides, etc. Generally, even a rail system can be used.

Alignment is effected in a particularly reliable manner when the first and/or the second alignment device are form fit devices, in particular, having slide surfaces, in particular, shaped as cone and/or wedge surfaces. Devices of this type are particularly robust, simple in structure and deliver reliable results. The first alignment device (rough alignment) may have wedge surfaces essentially acting in the horizontal direction and thus serve essentially for compensation of a transverse offset and/or rotation, as already described above. The wedge surfaces thus extend along the longitudinal extension of the center rotor type milling machine preferably toward the center of the machine. Reference is made to the above explanations for details in this respect. The second alignment device (fine alignment) preferably has wedge surfaces acting essentially in the vertical direction, such as conical surfaces protruding upward or downward. Reference is made to the above explanations for details in this respect as well.

According to a particularly preferred embodiment of the present invention, the first alignment device and the second alignment device are functionally arranged in series. This means that, for the overall mounting process, first a rough alignment using the first alignment device is effected. The second alignment device may have no function at this point. If a desired final position of the milling unit relative to the center rotor type milling machine has been reached with the first alignment device, the second alignment device takes effect, for example, by starting another movement of the center rotor type milling machine relative to the milling unit, while, to that end, the respectively acting elements of the first alignment device may optionally remain engaged or may get disengaged. The advantage is that the two alignment devices can be designed in a graduated manner in terms of their maximum tolerance limits and, as a result, a very fast and also very precise alignment of the milling unit relative to the center rotor type milling machine is possible.

Specifically, the first alignment device may comprise vertically protruding form fit elements, in particular, wedge surface elements, the counter elements, in particular, for the abutment to the wedge surface elements, being particularly present on the inner surfaces thereof, the form fit elements being arranged at the machine frame and the counter elements being arranged at the milling unit, or vice versa.

Preferably, the wedge surface elements are arranged in opposing pairs on the longitudinal sides of the center rotor type milling machine. Preferably, the wedge surfaces extend appropriately in or against the forward direction of advance of the center rotor type milling machine, so that the horizontal distance of the wedge surfaces tapers in or against the forward direction of advance of the center rotor type milling machine. This achieves an overall structure horizontally acting in a funnel-like manner, via which transverse offsets and/or rotations of the milling unit to the machine frame can be compensated to a comparatively great extent. The wedge surfaces may extend toward one another in a curved, stepped or even straight manner.

The second alignment device preferably comprises trunnions or teeth standing vertically with their longitudinal axes, preferably conical trunnions, and receptacle bores or receptacle recesses as counter-elements, the trunnions or teeth being arranged on the machine frame and the receptacle bores and receptacle recesses being arranged on the milling unit, or vice versa. To that end, reference is made, in particular, to DE 10 2014 011 856.8.

In order to achieve a functional arrangement in series, it is preferred if the vertical height of the vertically protruding form fit elements of the first alignment device is greater than the vertical height of the trunnions or teeth of the second alignment device. This makes it possible to selectively only engage the first alignment device by means of a height adjustment of the lifting columns and, only subsequently, by a further retraction of the lifting columns, additionally or alternatively the second alignment device.

It is advantageous if the milling drum box is connected to the machine frame via a quick coupling system, particularly a lockable and unlockable quick coupling system, which can be operated from the operator platform and/or if a connection block for simultaneously connecting multiple fluid and/or supply connections between the milling unit and the remaining center rotor type milling machine is provided. As a result, the time required for mounting and dismounting of the milling unit can be reduced even further. A corresponding quick coupling system for fastening the milling unit to the center rotor type milling machine is disclosed in DE 10 2014 011 856.8, for example.

Another aspect of the present invention finally lies in a transport unit for use in the method according to the present invention, the transport unit comprising at least one support device for receiving and supporting the milling unit. The support device is preferably designed in such a way that the milling unit can, on the one hand, be placed on it from above, and, on the other hand, a securing of the position of the milling unit on the transport unit is effected by the support device. The support device may have suitable support jaws, in particular, face-sided to the milling unit, and/or a receptacle cavity.

In order to facilitate displacement of the transport unit on the ground, for example, when the transport unit is slid under or pulled out from under the center rotor type milling machine from the side in the ways and manners described above, the transport unit is preferably supported on rolls or comparable devices at least on one side. In this regard, it is ideal when the rolls do not protrude beyond the support surface of the transport device.

Since it may be required for the mounting and dismounting or exchanging process that the milling unit can be moved on the transport unit with the latter on the one hand, and, on the other hand, also that the milling unit can transported to the respective construction site together with the transport unit, the transport unit preferably comprises a, particularly releasable, fastening device for a swap body truck, in particular, for a swap body truck having an hydraulically displaceable load arm. Swap body trucks are, in particular, trucks which are designed as carrier vehicles for transporting special containers and which can autonomously load and unload said containers, i.e., without another vehicle, in short time, for example, with a hydraulic load arm. This significantly simplifies the logistic efforts for the transport of the transport unit, since, in particular, loading and unloading the transport unit can be effected in a rapid manner.

Preferably, the transport element comprises a base plate on which the support device, the rolls and/or the fastening device are fastened. Side walls which are at least partially pivotable to the side edges may be present on the base plate, although it is preferred to design the transport unit in a most flat manner at least on three sides or, in particular, on the side opposite the fastening device for the swap body vehicle. Preferably, the base plate is thus designed to be at least partially free of side walls protruding upward, in particular, in the region in which the transport device is positioned below the machine frame of the center rotor type milling machine during the mounting and dismounting process.

In order to further simplify the positioning process of the transport unit relative to the center rotor type milling machine, an insertion limit, ideally protruding at the face side, is preferably comprised by the transport unit, said limit being designed to stop against the machine frame when the center rotor type milling machine is in the exchange adjustment position.

The transport device is suitable for use in the above-described method according to the present invention and for use with the above-described center rotor type milling machine according to the present invention.

BRIEF DESCRIPTION OF THE DRAWINGS

The present invention will be explained in more detail below with reference to the exemplary embodiments shown in the figures. In the schematic figures:

FIG. 7b shows an enlarged detailed view of region A of FIG. 5a;

FIG. 8b shows a sectional detailed view of region A of FIG. 4a;

Like components are indicated with like reference numerals throughout the Figures, wherein not each and every component necessarily is repeatedly indicated in each of the Figures.

DETAILED DESCRIPTION OF THE INVENTION

Figure 1:
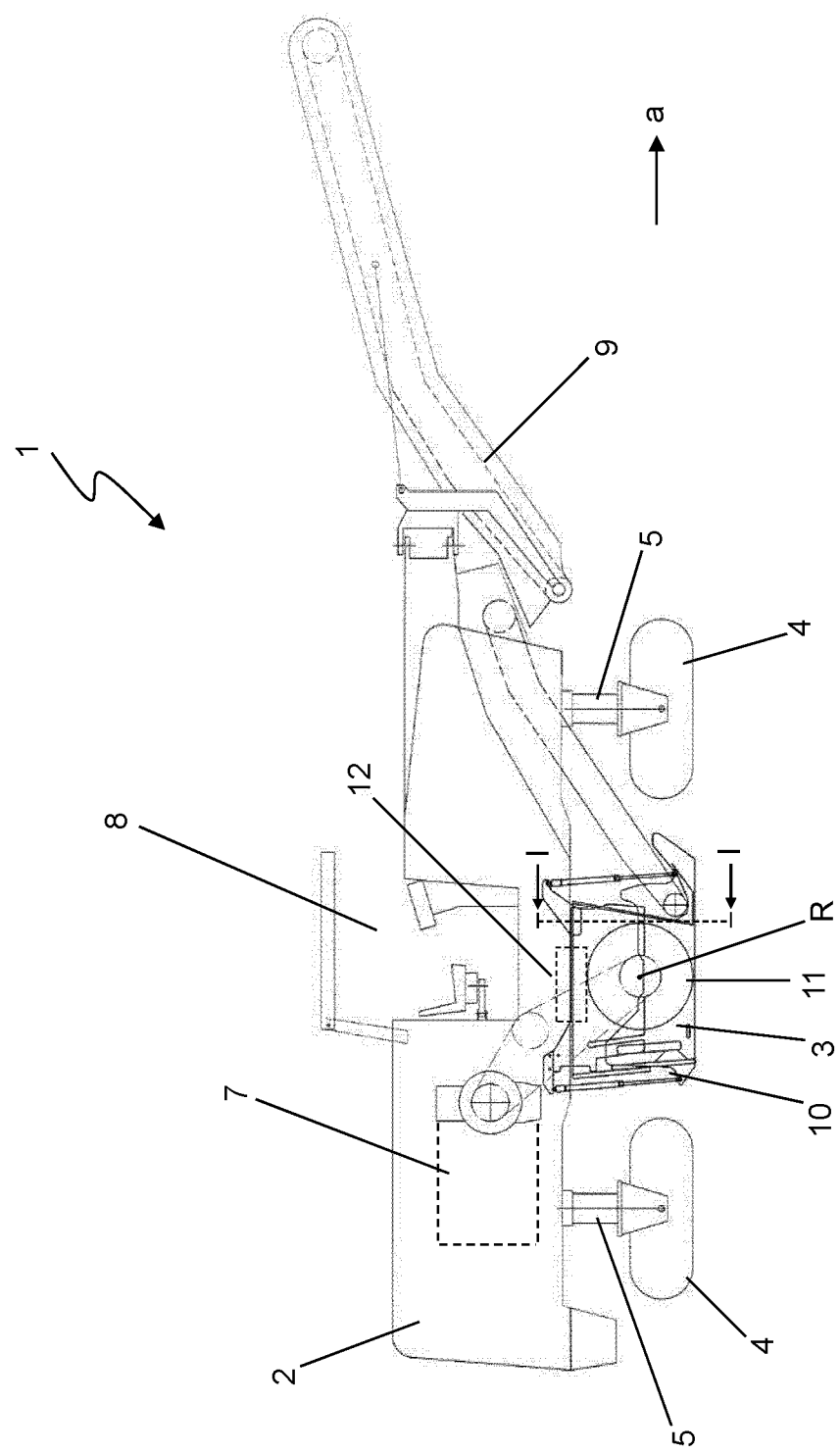
FIG. 1 shows a side view of a center rotor type milling machine.

FIG. 1 shows a generic center rotor type milling machine 1, in the present case a road cold milling machine. In this case, said machine specifically is a large-scale milling machine of the center rotor type. Essential elements of the center rotor type milling machine are a machine part 2 and a milling unit 3. The machine part 2 includes a machine frame 6 supported by travelling devices 4 via lifting columns 5, with a drive engine 7, an operator platform 8 and a milled material conveyor device 9. The lifting columns 5 enable height adjustment of the machine frame 6 in the vertical direction V relative to the ground. The drive engine 7 delivers the drive energy required for the drive propulsion and the drive of the milling device as described below. During working operation, operation of the center rotor type milling machine 1 is effected from the operator platform 8 by an operator. During working operation, the center rotor type milling machine 1 travels over the ground to be processed in the working direction and mills off milling material. This is specifically effected with the milling unit 3, comprising a milling drum box 10 as well as a milling drum 11, which is arranged inside the milling drum box 10. The milling drum box 10 all in all comprises a front wall, a rear wall, an upward cover located above the milling drum as well as covers to the sides to the right and to the left. The milling drum box 10 is designed to be open toward the ground, so that the milling drum 11 positioned within the milling drum box 10 can engage the ground. For the milling operation, the milling drum 11 rotates about a horizontal rotation axis R extending transversely to the working direction a.

The milling unit 3 is designed to be demountable as a modular unit relative to the machine part 2 of the center rotor type milling machine 1, for example, for transport and exchange purposes. To that end, a fastening device 12 for connecting the milling unit 3 to the machine part 2 is provided, which is merely schematically shown in FIG. 1. The structure and functionality of said fastening device 12 (support connection) will be explained in the following figures in greater detail by way of example. It will be readily appreciated that for mounting/dismounting the milling unit 3 the drive train (functional connection), which in the present embodiment is partially designed as a belt drive, must be separated and re-established after installation of the milling unit 3. As an alternative, a drive connection to a hydraulic system is possible as well.

Figure 2:
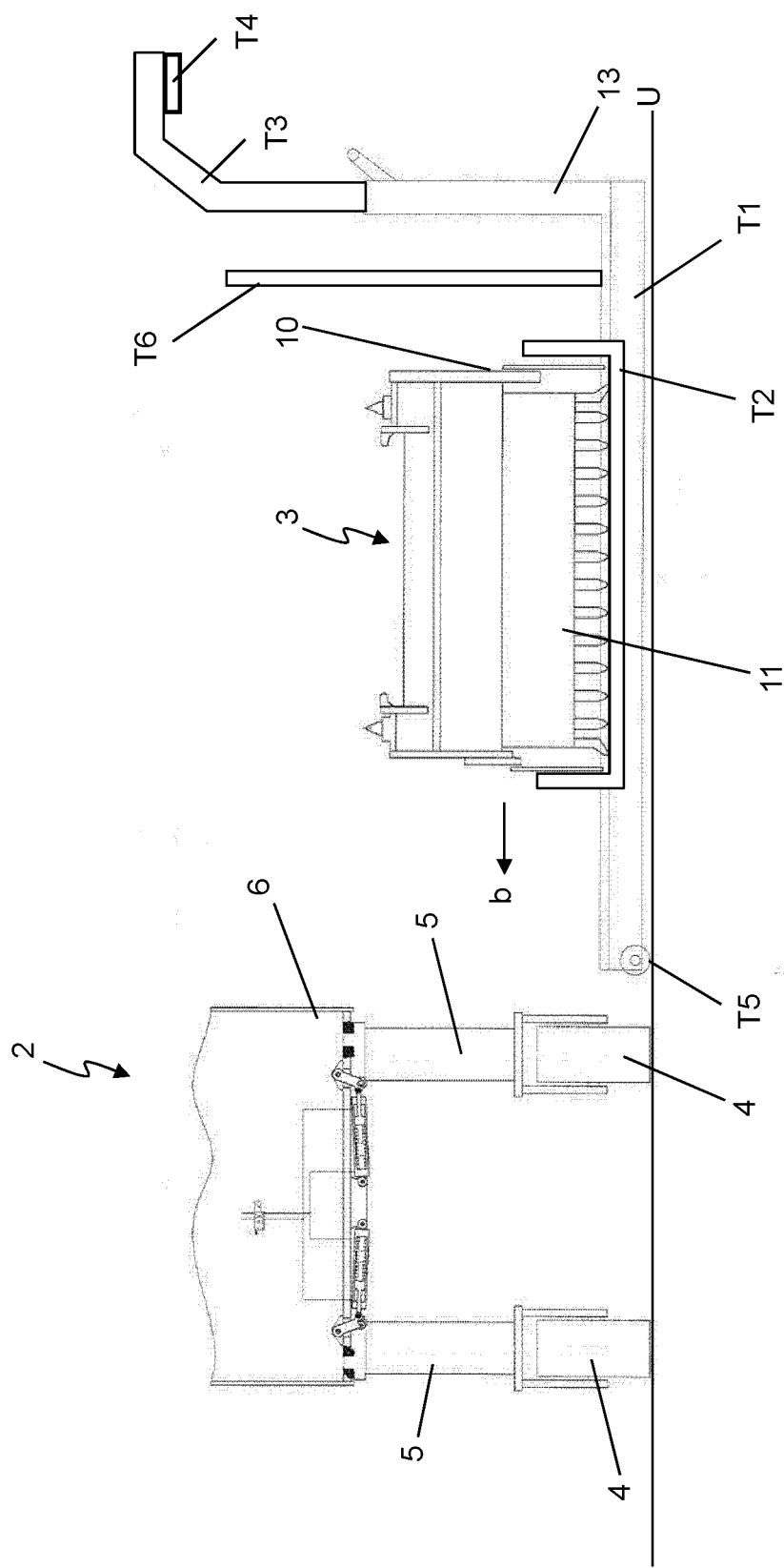
FIG. 2 shows a partial sectional view through the center rotor type milling machine with separate milling unit.

FIG. 2 shows the state prior to the installation of the demounted milling unit 3, with the milled material conveyor device not shown, prior to the installation of the milling unit 3 at the machine part 2 in view direction of the arrows to section line I-I of FIG. 1. In the present exemplary embodiment, the milling unit 3 is slid via a special transport unit 13 in the direction b from a position laterally next to the machine part 2 transversely to the working direction a underneath the machine part 2 between the front and rear travelling devices 4. Here, other alternatives are conceivable and are comprised by the present invention. The machine frame 6 of machine part 2 is adjusted via lifting columns 5 in the vertical direction upward into an exchange adjustment position so that sufficient space is available underneath machine frame 6 of machine part 2. Machine part 2 and milling unit 3 are very roughly aligned to one another.

The transport unit 13 includes a base plate T1, on which a support device T2 is mounted for reception and positional stabilization of the milling unit 3. In particular, vertically protruding support walls are provided to that end, which stabilize the milling unit 3 to the face side. Furthermore, an upward projecting transport arm T3 is present, which has a corresponding counter-part T4 for engagement with a load arm of a swap body truck. On the face side of the base plate T1 opposite the transport arm T3, rolls T5 are present, which can roll on the ground U and thus enable easier movement of the transport unit 13. The transport unit 13 further comprises a wall vertically projecting toward the transport arm T3, said wall serving as an insertion limit T6 or stop. The wall extends in the vertical direction thus far that the wall does not fit into the region underneath the machine frame of the center rotor type milling machine even when the lifting columns are in the exchange adjustment position.

Figure 10:
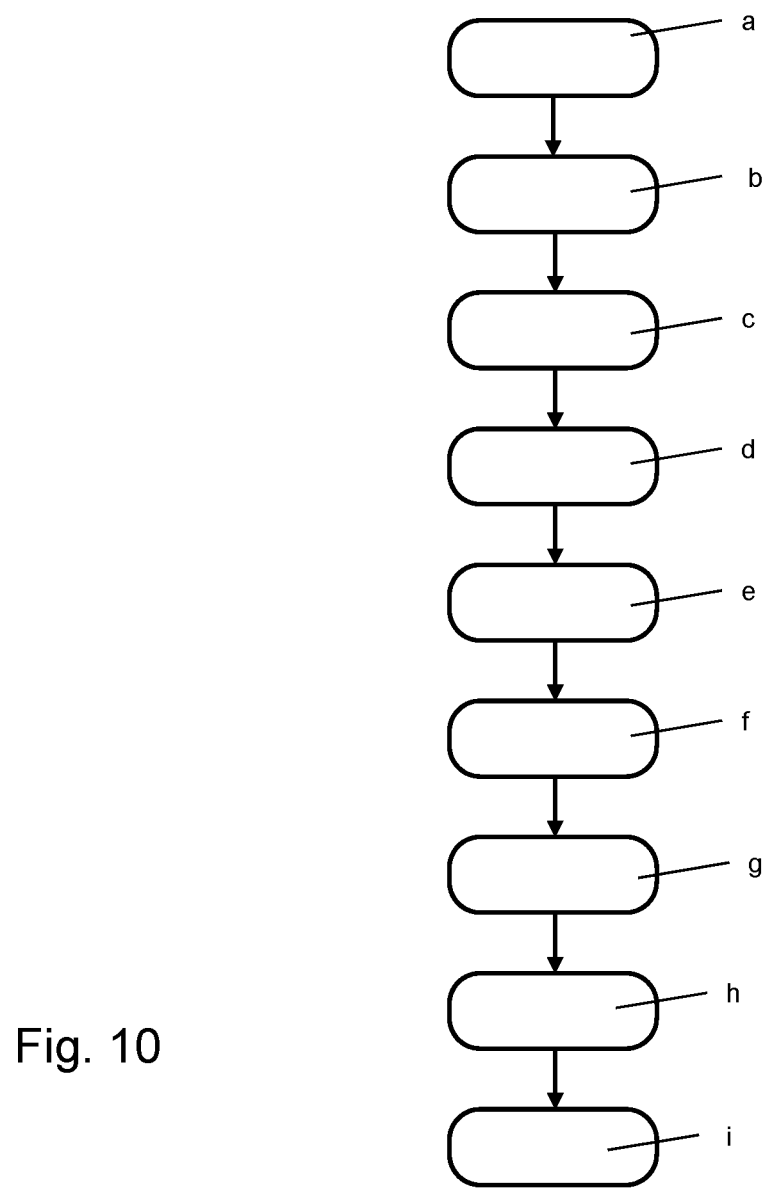
FIG. 10 shows a flow chart of a method according to the present invention.

FIGS. 3a to 3k emphasize further details of the present example of a method according to the present invention for dismounting and mounting or exchanging the milling unit 3, and reference is also made to the individual steps indicated in the general part of the description. The sequence of the method according to the present invention is schematically shown in FIG. 10.

Figure 3A:
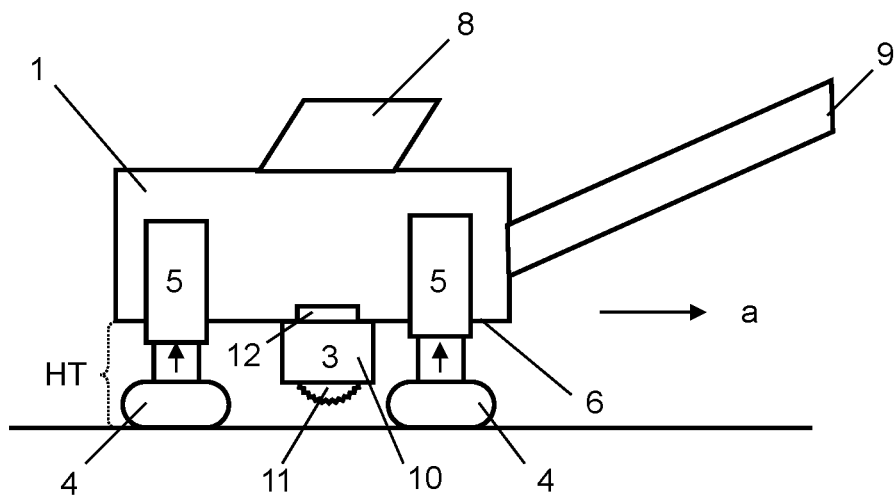
FIGS. 3a to 3k show the sequence of an exchanging process in a side view.
Figure 3B:
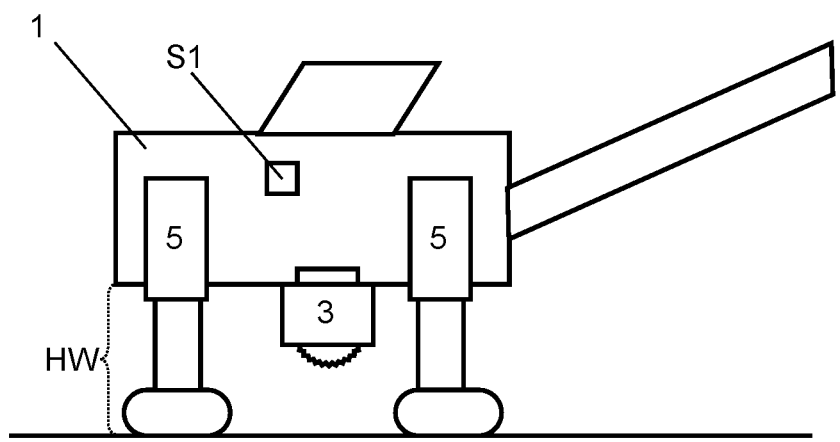
Figure 3C:
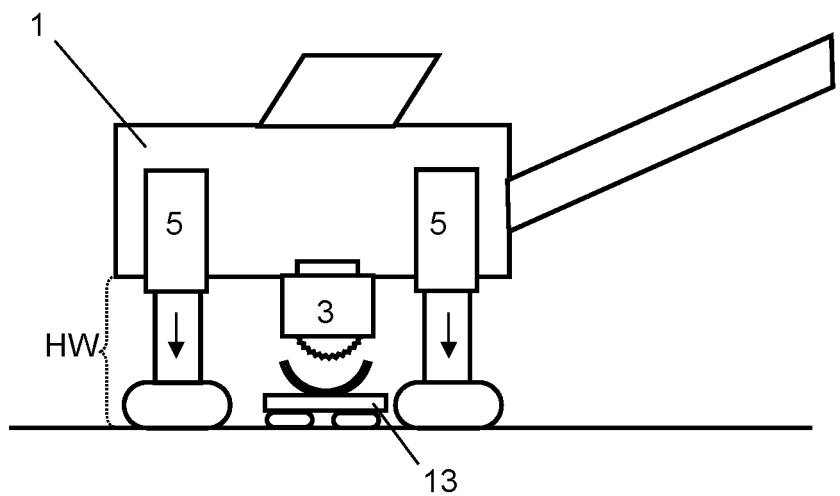

FIG. 3a is the starting point. The center rotor type milling machine 1 here is in the transport adjustment position with respect to the height position of the lifting columns. In this state, the center rotor type milling machine can be moved to a place of operation, for example, (step a) in FIG. 10). Here, the machine frame is at height HT in the vertical direction above the essentially planar and horizontally extending ground U. If now the dismounting of the milling unit is initiated, first the lifting columns are extended further in the arrow direction until reaching the exchange adjustment position according to FIG. 3b and the machine frame has a distance HW to the ground U (step b) in FIG. 10). To this end, provision may be made for a lift path limitation for transport and working operation to be deactivated, either manually or via the machine control. The distance HW is larger than the distance HT. In this state, the center of mass of the center rotor type milling machine is higher than in the transport adjustment position. Furthermore, a control unit S1 may be provided, which, when exceeding the height adjustment beyond the transport adjustment position or when reaching the exchange adjustment position, only allows a limited travelling operation, in particular, with respect to the maximum permitted travelling speed and/or distance, and/or a limited steering angle. Here, the term "limited" is to be understood in that the maximum possible travelling speed is substantially less than in transport operation. Alternatively or additionally, even the maximum permitted travelling distance in this state may be limited by the control unit S1. For the sake of clarity, the control unit is indicated as an example only in FIG. 3b, but relates to the entire process of FIGS. 3a to 3k. The current height position of the lifting columns is monitored and transmitted to the control unit via suitable sensors which are not further shown in the Figures, e.g., capacitive sensors within the lifting columns.

Figure 3D:
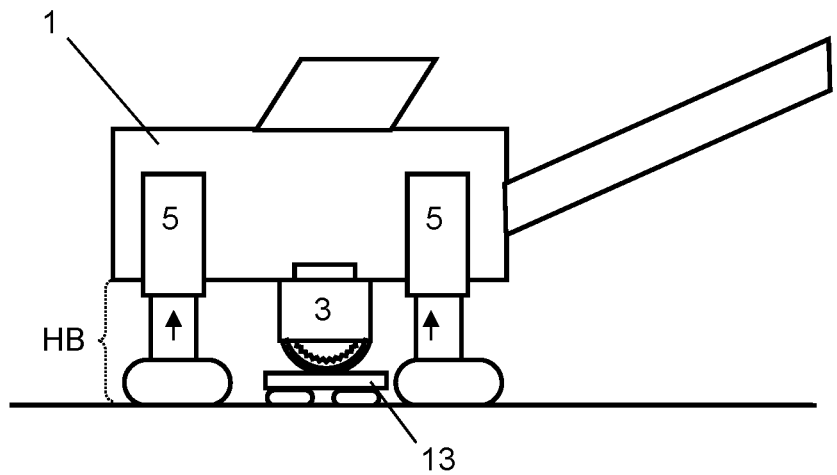

The ground clearance achieved below the milling unit is sufficiently great that the transport unit can be brought under the milling unit, for example, from the side transversely to the longitudinal direction of the center rotor type milling machine (FIG. 3c; step c) in FIG. 10. Now, the lifting columns are retracted in the arrow direction in said relative position of the transport unit 13 and the center rotor type milling machine 1, thereby reducing the distance of the machine frame to the ground to become the distance HB, until the milling unit, as indicated in FIG. 3d, rests on the transport unit (step d) in FIG. 10). Usually, the distance HB is between the distances HT and HW. In this state, existing connection fastenings of the milling unit to the remaining center rotor type milling machine, usually to the machine frame thereof, are released. Furthermore, functional connections such as connections of the hydraulic system of the center rotor type milling machine, electric connections and drive connections, are released, for example, by removing the drive belts or corresponding hydraulic connections.

Figure 3E:
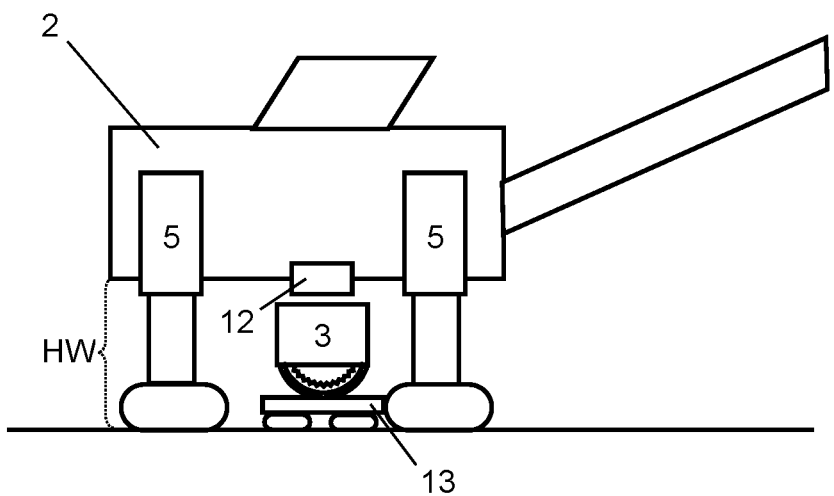
Figure 3F:
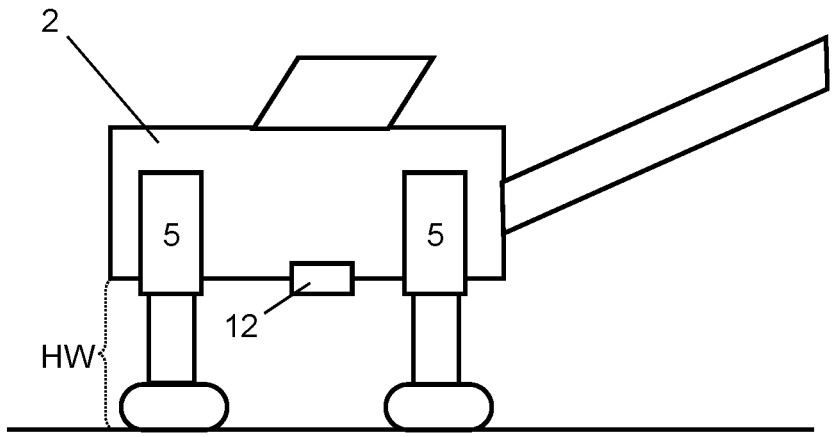

For reaching distance HW, the lifting columns can be extended in the arrow direction again, with the milling unit, separated from the center rotor type milling machine, remaining on the transport unit 13 (FIG. 3e). The transport unit will subsequently be pulled away from below the center rotor type milling machine together with the milling unit 13 (step e) in FIG. 10) and may be loaded onto a truck, for example. FIG. 3f shows the state of the center rotor type milling machine directly after removing the transport unit 13. On the one hand, it is now possible to lower the center rotor type milling machine again to the height HT and to also load it onto a transport vehicle, for example, if merely dismounting and mounting the milling unit 13 is required. Mounting the same or a different milling unit is effected based upon the situation illustrated in FIG. 3f, i.e., center rotor type milling machine 1 without milling unit 3 is brought into the exchange adjustment position according to FIG. 3f on a most horizontal and planar ground U, be it at the same location or at another location.

Figure 3G:
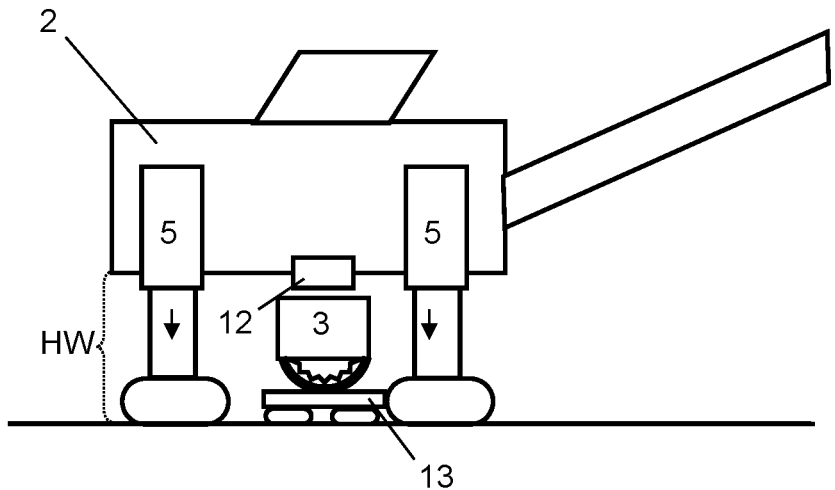
Figure 3H:
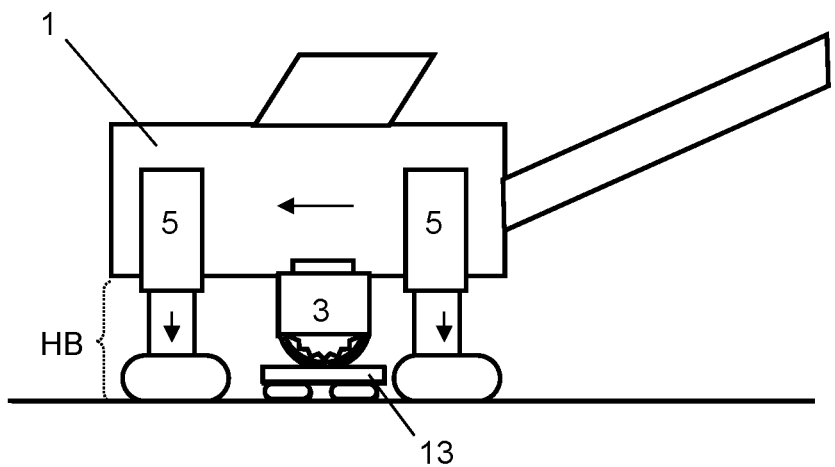

When the exchange adjustment position with ground clearance HW is reached (step f) in FIG. 10), the transport unit 13 may be moved under the center rotor type milling machine 1 in the region between the front and rear travelling devices, as illustrated in FIG. 3g. An essential factor for connecting the milling unit 3 to the center rotor type milling machine is that a correct and precise alignment of the milling unit 3 relative to the center rotor type milling machine 1 is effected, so that the provided fastening devices between the milling unit 3 and the center rotor type milling machine 1 can be used in an optimum manner and, to the extent possible, without wear. To that end, a two-stage alignment device is provided to be explained in greater detail below. FIG. 3g illustrates in this context already that a first rough alignment after a first slight lowering is effected by a forward and/or backward movement of the center rotor type milling machine in and/or against the arrow direction, whereby respective guide elements at the milling unit 3 and at the center rotor type milling machine 1 of a first alignment device get in a horizontal overlapping, whereby the milling unit 3 is roughly positioned relative to the center rotor type milling machine. By a subsequent further lowering, the guide elements at the milling unit 3 and the center rotor type milling machine 1 of a second alignment device get into a horizontal and vertical overlapping, resulting in fine alignment of the milling unit 3 relative to the center rotor type milling machine 1. Here, the lifting columns are retracted until the center rotor type milling machine almost rests on the milling unit (FIG. 3h, height HB). In this position, support and functional connections are established between the milling unit 3 and the center rotor type milling machine 1 (step g) in FIG. 10), comprising, for example, the connection of hydraulic supply lines, electric connections and/or drive connections, such as, in particular, a belt connection for a drive belt transmission for driving the rotation of the milling drum of the milling unit. As an alternative, it is also possible to only establish the support connections or the fastening of the milling unit 3 to the center rotor type milling machine 1, so that the milling unit can be lifted by the center rotor type milling machine 1, and to close further connections later.

Figure 3I:
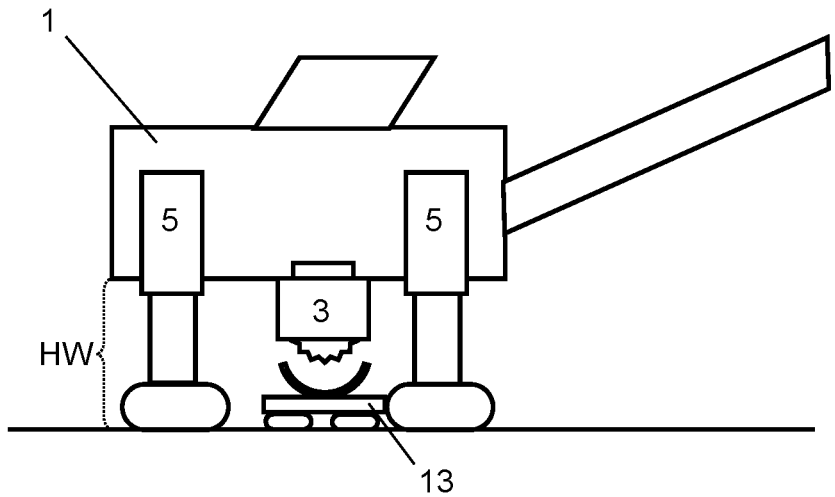
Figure 3J:
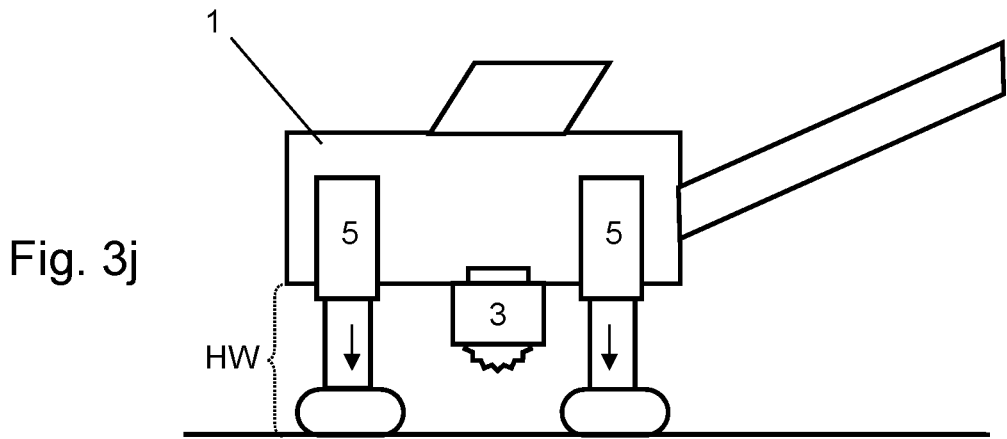
Figure 3K:
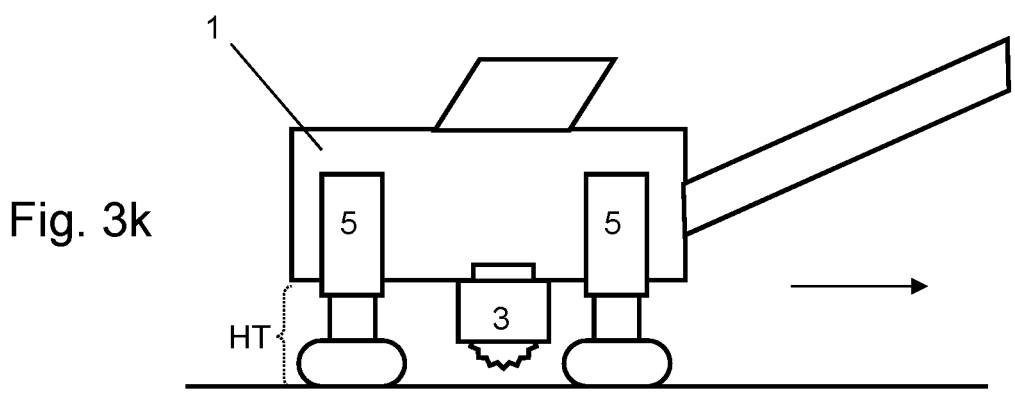

Subsequently, according to FIG. 3i, the center rotor type milling machine 1, now including the milling unit 3, is lifted by extending the lifting columns until reaching height HW. Subsequently, removal of the transport unit 13 (step h) in FIG. 10) is effected under the center rotor type milling machine (FIG. 3j) as well as lowering or retracting the lifting columns (step i) in FIG. 10) to a height HT, so that a regular travelling operation of the center rotor type milling machine is possible again.

The process shown in FIGS. 3a to 3k is merely to be understood as an explanation. The essential factor with regard to FIGS. 3a to 3k is that adjusting the height of the transport unit 13 is not required for dismounting and mounting the milling unit on the one hand, and, on the other hand, the center rotor type milling machine 1 per se reaches a sufficient ground clearance by extending the lifting columns to the exchange adjustment position, so that the transport unit 13 can be placed under the machine, thus also enabling a fastening of the milling unit to the center rotor type milling machine.

One variant also covered by the present invention lies with using longer lifting columns or lifting columns that enable a greater lift adjustment than lifting columns known so far. However, due to the construction-related tilt tendency of the machine when the lift columns are extended, it is also in this case that the height HW is reserved for the mounting and dismounting process and is not suitable for the regular travelling operation with the maximum height HT of the center rotor type milling machine. For example, this may be ensured by the above mentioned control unit S1. However, it is preferred when the lifting columns are extended for the exchange process or for reaching the height HW into a region which would not be acceptable for regular travelling and working operation, i.e., with an "over-lift". This is further illustrated in FIGS. 4a to 4d.

Figure 4A:
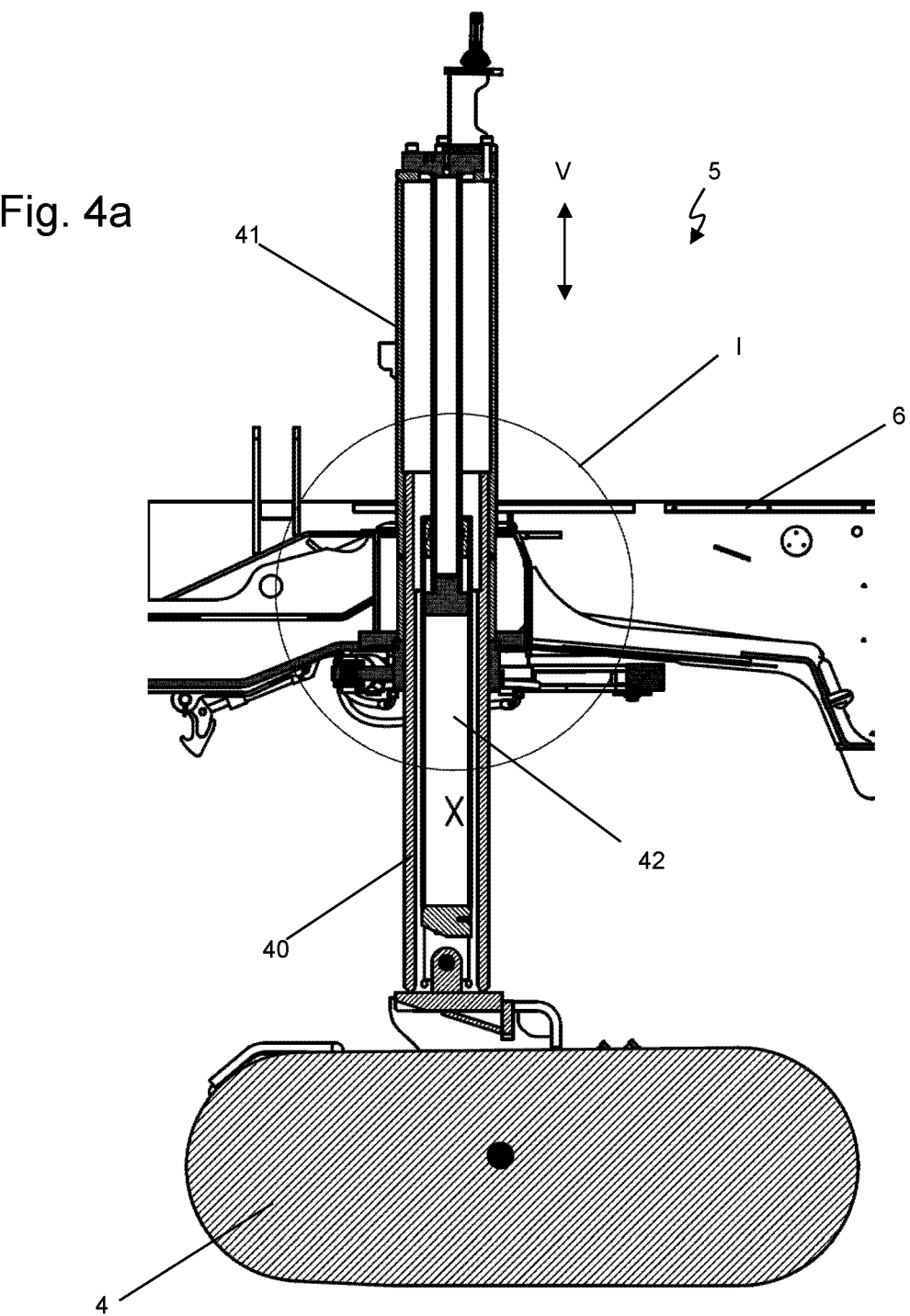
FIGS. 4a to 4d show sectional views through a lifting column.
Figure 4B:
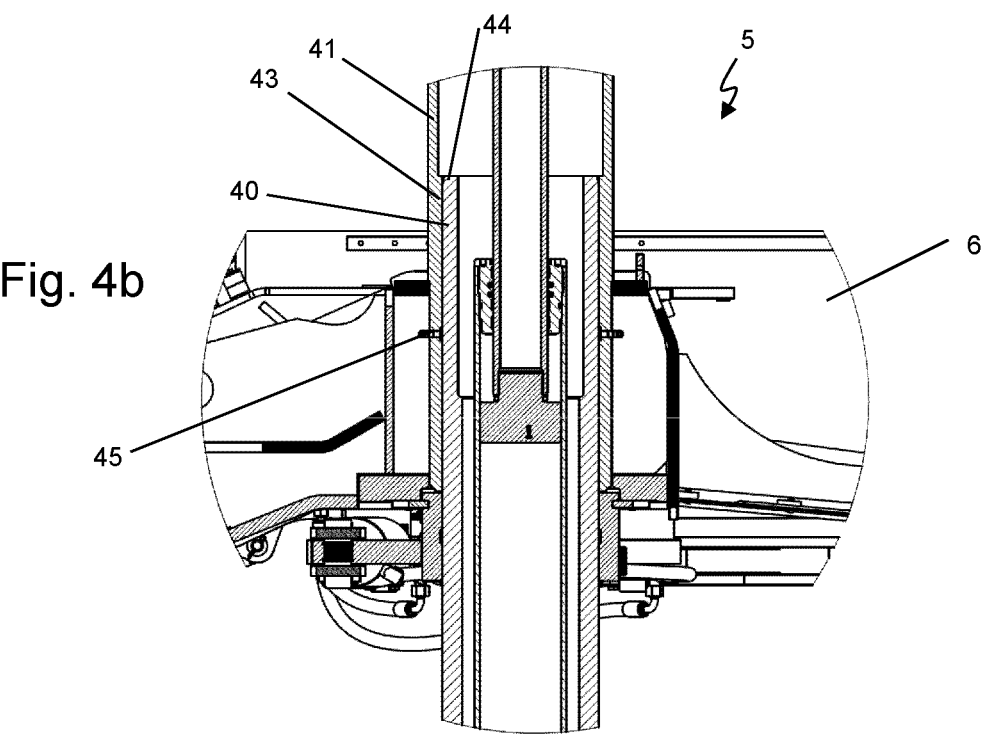
Figure 4C:
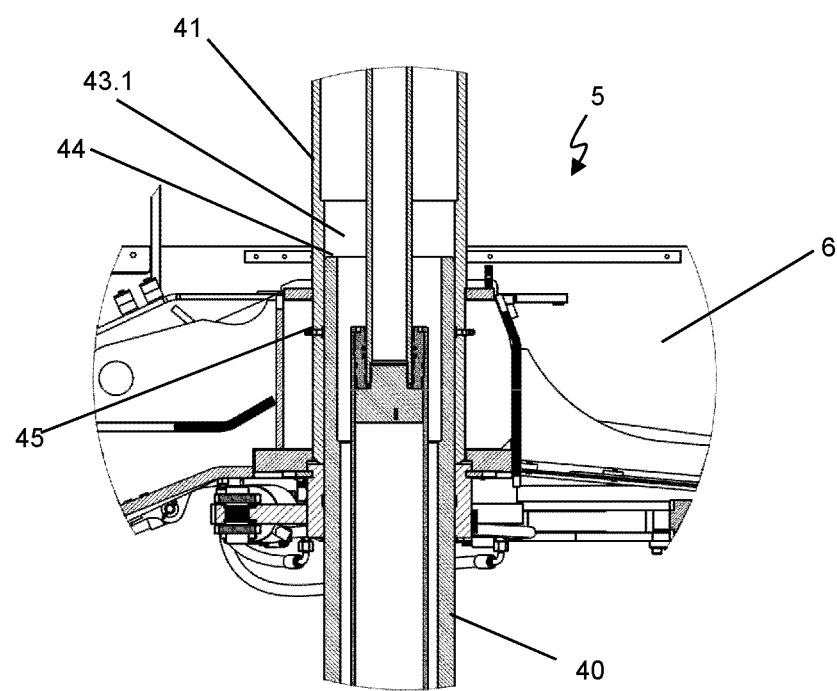
Figure 4D:
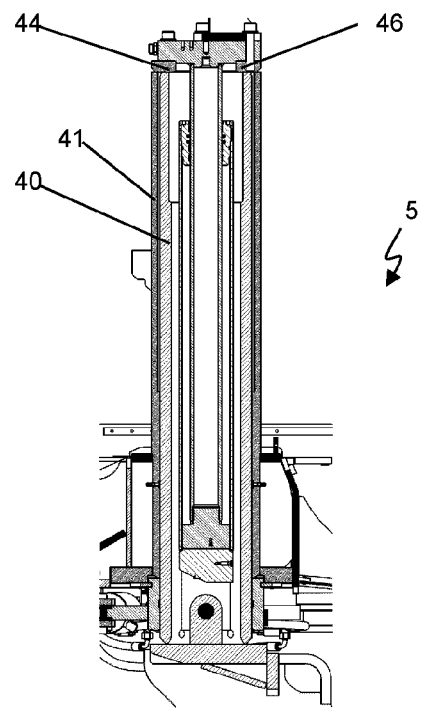

FIG. 4a is a longitudinal vertical sectional view through a lifting column 5. FIG. 4a illustrates that the lifting columns represent the link between the machine frame 6 and the respective travelling device 4. Each lifting column 5 comprises an inner part 40 and an outer part 41. A cylinder-piston unit 42 is arranged in the interior, via which the lift adjustment is driven. The inner part 40 and the outer part 41 are both designed as essentially hollow-cylindrical and contact one another via the contact region 43. Thus, said contact region 43 is a sliding guide between the inner part 40 and the outer part 41. In FIG. 4a, the lifting column is extended into the transport adjustment position HT. Further details in this regard may be taken from FIGS. 4b to 4d. FIGS. 4b and 4c are detailed views of region I in FIG. 4a, the lifting column being shown in the transport adjustment position HT in FIG. 4b and in the exchange adjustment position HW in FIG. 4c. FIG. 4d illustrates the maximum retracted position of lifting column 5 along the length of the outer part 41.

Both the inner part 40 and the outer part 41 are essentially designed as a sleeve. Accordingly, the contact region 43 also has a sleeve shape. In the present example, the contact region 43 is at the lower end of the outer part 41 viewed in the vertical direction and at the upper end of the inner part 40. FIG. 4b illustrates that the inner part 40, which is arranged at the bottom in this example, has an upper face side end 44. In the transport adjustment position HT, the inner part 40 is pushed out of the outer part so far that it terminates with its upper face side end 44 almost flush with the upper end of the contact region at the outer part 40, which is designed there as a sleeve protrusion which projects inward. The inner part 40 and the outer part 41 thus still abut one another in a maximal fashion. If the lifting column is further extended, the face side end 44 of the inner part 40 is displaced into the contact region 43, as illustrated in FIG. 4c. This achieves a region 43.1, in which the contact region 43 is exposed at the outer part 41 compared to the inner part 40 and a contact is no longer existent. The contact surface between the inner part 40 and the outer part 41 is thus smaller than originally provided. However, the resulting less stable support of the inner part 40 at the outer part 41 is acceptable in the scope of the present invention if it is limited to the exchange process or the mounting and/or dismounting process of the milling unit on the center rotor type milling machine, since there will be almost no travelling movements at all.

In the present case, the lifting column 4 further comprises a lubrication groove 45 in the region of the outer part 41. Said groove is approximately at the height of the center of the entire contact region 43 on the side of the outer part 41. In this case FIG. 4b shows a maximum over-lift of approx. 10 cm. This ensures that the face side end 44 of the inner part is not displaced beyond the lubrication groove 45 in order to prevent the lubrication film from being impaired. This may be ensured by a suitable safety device.

In contrast, FIG. 4d illustrates the maximum retracted state of the lifting column 4. The adjustment path is limited by an upper flap 46 placed on the outer part 41, against which the inner part 40 comes to rest with its face side end 44.

Figure 9:
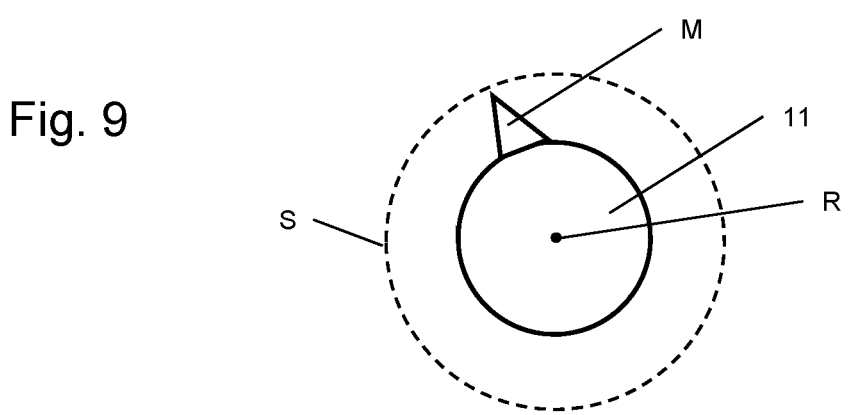
FIG. 9 shows a schematic side view of a milling drum.

With respect to the specific configuration regarding the lift paths of the lifting columns 4, reference is made to the corresponding explanations in the general part of the description. For further illustration, reference is further made to FIG. 9. Said figure shows a side view of a milling drum 11. In working operation, it rotates about the rotational axis R extending horizontally and transversely to the working direction. On its outside jacket surface, the milling drum 11 comprises, in a well-known manner, a plurality of cutting tools M, for example, chisel holders with chisels. These tools, respectively their ends located radially outside, define the cutting circle S of the milling drum 11 or milling rotor 11.

Figure 5A:
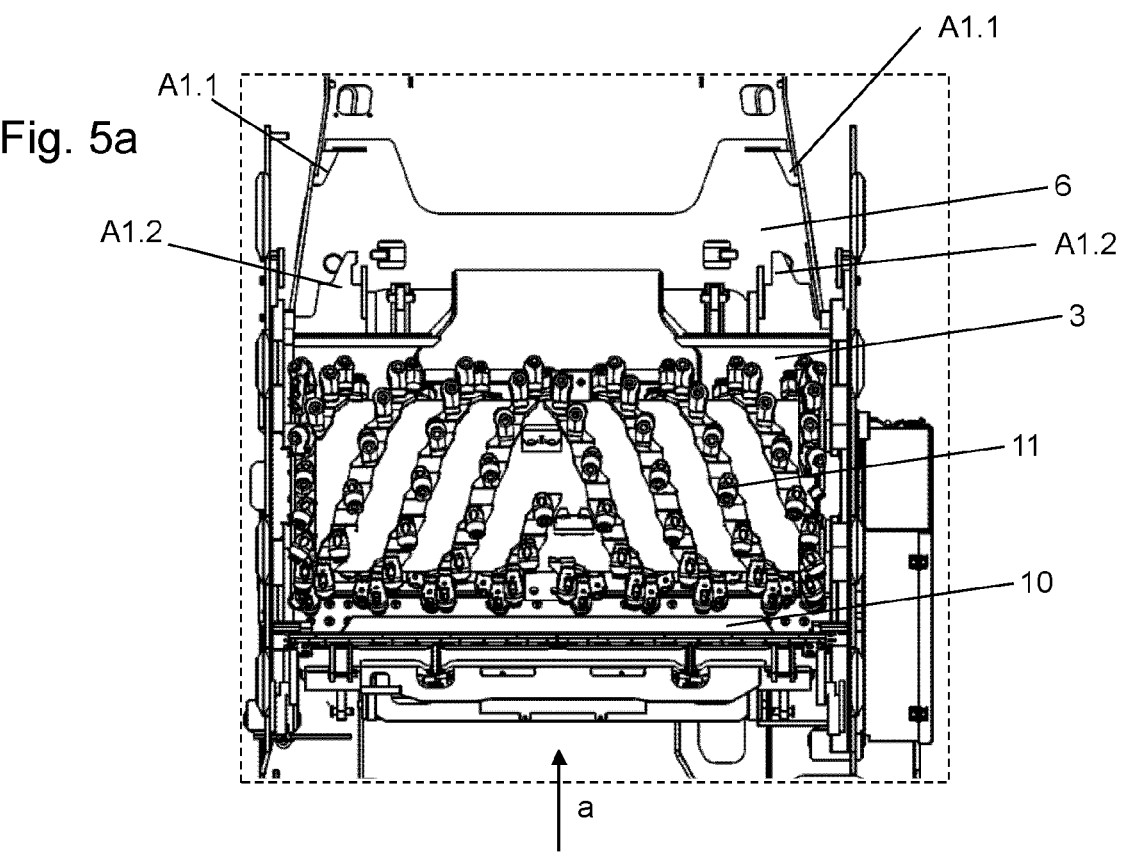
FIGS. 5a to 5c show detailed views concerning rough alignment with a first alignment device in a view from below to the milling unit and the bottom side of the center rotor type milling machine.
Figure 5B:
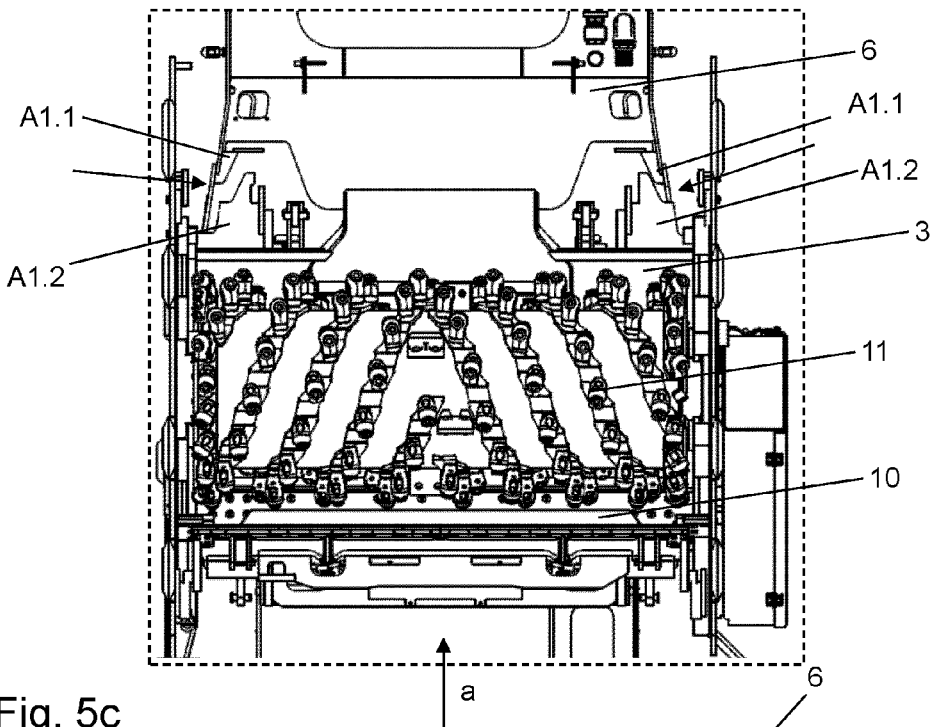
Figure 5C:
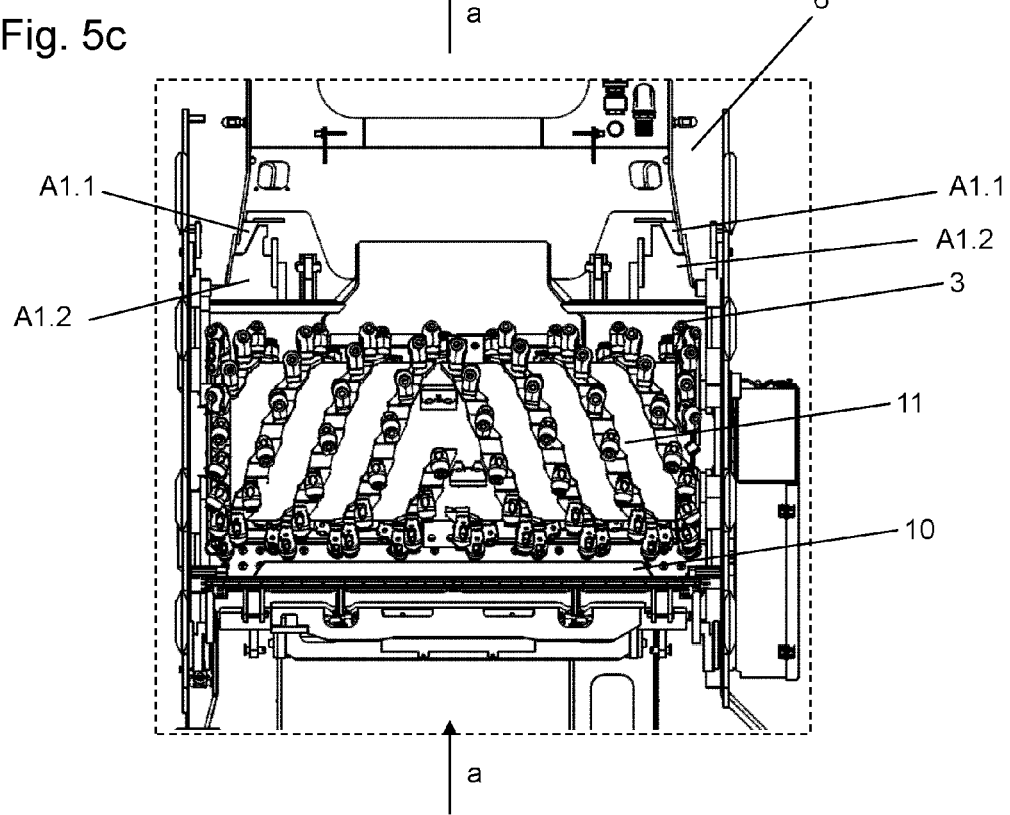

FIGS. 5a to 5c illustrate the effects of the first alignment device A1 for rough alignment. FIGS. 5a to 5c show the region between the front and the rear travelling devices in a view from below, i.e., ground U. Here, FIG. 5a corresponds to FIG. 3g. For the sake of clarity, the forward direction or the working direction a of the center rotor type milling machine is also indicated in FIGS. 5a to 5c.

Elements of the first alignment device A1 are wedge surfaces A1.1 arranged at the machine frame and wedge surfaces A1.2 arranged at the milling unit, said surfaces forming a form fit device, wherein in each case one pair with wedge surfaces A1.1 and A1.2 is arranged at the right side and at the left side. The wedge surfaces A1.1 protrude from the machine frame downward in the vertical direction and the wedge surfaces A1.2 protrude from the milling unit 3, specifically from the milling drum box, upward in the vertical direction. If the machine frame of the center rotor type milling machine 1 is lowered, the wedge surfaces A1.1 and A1.2 come to overlap one another with respect to a virtual horizontal plane. An essential factor is that the elements of the second alignment device A2, which will be explained in greater detail below, do not yet overlap one another in a virtual horizontal plane at this point. In FIGS. 4a to 4c, the milling unit 3 rests on the transport device. If now the center rotor type milling machine 1 moves against the arrow direction a, i.e., moves backward in this specific case, the wedge surfaces A1.1 and A1.2 further approach one another. Each of the wedge surfaces extends in the horizontal plane essentially in a straight line obliquely toward the center in the working direction a or in the forward direction of advance. The wedge surfaces A1.1 and A1.2 of a pair are further designed complementary to one another.

In FIG. 5b the wedge surface A1.1 and A1.2 have approached sufficiently close enough that the pair located at the right side (with respect to the view in FIGS. 5a to 5c) abuts one another already. This is not the case for the left pair yet. Thus, in the position shown in FIG. 5b, the milling unit 3 has a transverse offset to the right. If the center rotor type milling machine is moved further, the milling unit is forced to the left by the effect of the wedge surfaces so that the transverse offset is compensated step by step.

The final position of this rough centering is shown in FIG. 5c. The pairs of the wedge surfaces A1.1 and A1.2 abut one another in a form fitting manner both on the right and the left side. If the center rotor type milling machine would be further moved backward, it would carry with it the milling unit 3 via the contacting wedge surfaces, not least by the stop surfaces adjoining the wedge surfaces A1.1 and A1.2 and extending horizontally and transversely to the direction a.

Figure 6A:
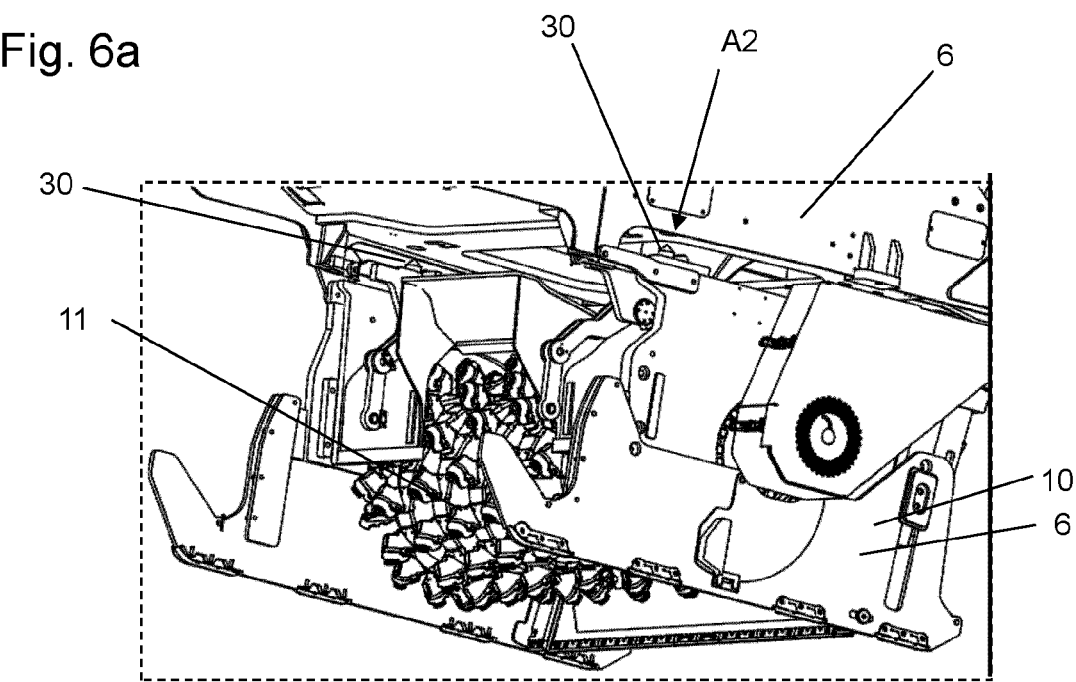
FIGS. 6a and 6b show detailed views concerning fine alignment with a second alignment device in a perspective view of the milling unit and the left side of the center rotor type milling machine (detail) obliquely from the front.
Figure 6B:
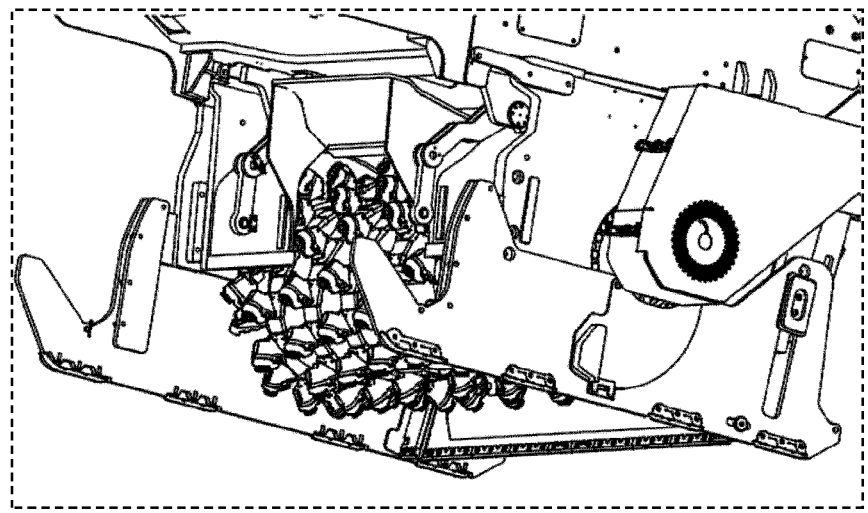

FIGS. 6a and 6b show the function of the second alignment device A2, and reference is made to FIGS. 7a to 8b in this respect. Elements of the second alignment device A2 are centering cones 30 protruding from the milling unit in the vertical direction, with said cones also being arranged spaced from one another transversely to the longitudinal direction of the center rotor type milling machine. Receptacle bores are present at the machine frame for receiving the centering cones 30, although said bores are not visible in FIGS. 6a and 6b. FIGS. 6a and 6b illustrate the milling unit still in the state resting on the transport unit 13, said unit not being illustrated in these figures for the sake of clarity. Once the pre-centering by means of the alignment device A1 is finished, the tips of the centering cones rest reliably within the circumference of the receptacle bores at the machine frame viewed in the vertical direction. If the lifting columns are further lowered, the centering cones engage the receptacle bores so that the bores can slide-off with their edges on the centering cones. This achieves that the relative position of the milling unit 3 and the center rotor type milling machine 1 are exactly aligned so that the milling unit 3 can be fastened to the center rotor type milling machine, for example, by means of the fastening device described below. During fine alignment, the slide surfaces of the first alignment device A1 slide past one another in the vertical direction. Thus, it is important that the wedge surfaces of the first alignment device are constructed in such a way that they permit said movement.

Figure 7A:
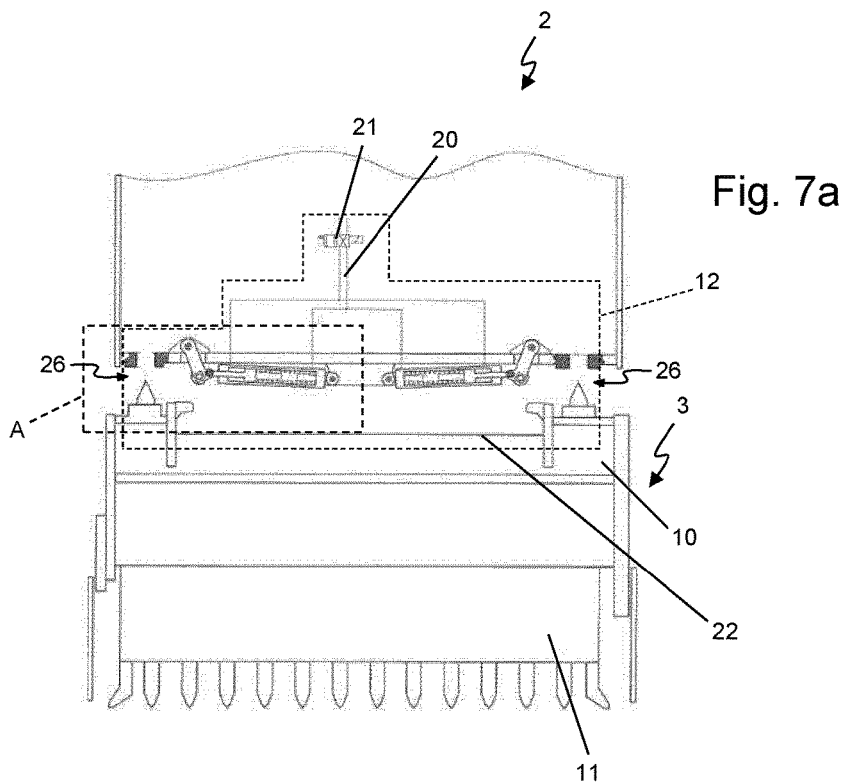
FIG. 7a shows a cross-sectional view of FIG. 2 with a milling unit pre-positioned relative to the machine part.
Figure 7B:
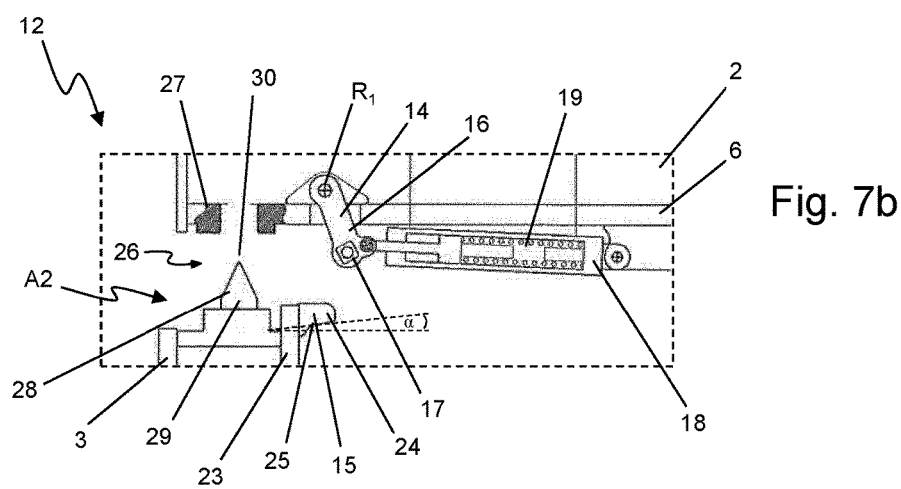

For further illustration, FIG. 7a shows the milling unit 3 in the position pre-positioned by the first alignment device A1 underneath the machine part 2, with the transport unit 13 as well as the lifting columns 5 and the travelling device 4 being omitted in this case for the sake of clarity. Furthermore, FIG. 7b illustrates region A of FIG. 6a in an enlarged view. An essential factor for fastening the milling unit 3 to the machine part 2 or the machine frame 6 lies with the fastening device 12, essential details of which are particularly indicated in FIG. 6b. The fastening device 12 with its individual elements is partially supported on the milling unit 3 and partially supported on the machine part 2 in a fixed or movable manner. A complete dismounting of parts of the fastening device 12 from the milling unit 3 and from the machine part 2 is not provided so that the elements of the fastening device 12 are all in all arranged at the parts 2 and 3 in a fixed manner.

In the present exemplary embodiment, the fastening device 12 specifically includes a locking element 14 and a counter element 15. The locking element 14 is designed as a single-arm pivot lever pivotally mounted at the machine frame, which lever is movable, in this case pivotable, about a pivot axis R1 extending horizontally and in the working direction a between the release position indicated in FIG. 6b and the locking position, which is shown, for example, in FIG. 7b to be explained in greater detail below. At the end opposite the rotation axis R1, a locking protrusion 17 is present at the locking lever 16, which protrudes from the adjacent surface of the lever element toward the observer from the image plane in FIG. 6b. It may also be provided that said locking protrusion is arranged between two similarly designed locking levers 16 in the form of a support bracket.

Figure 8A:
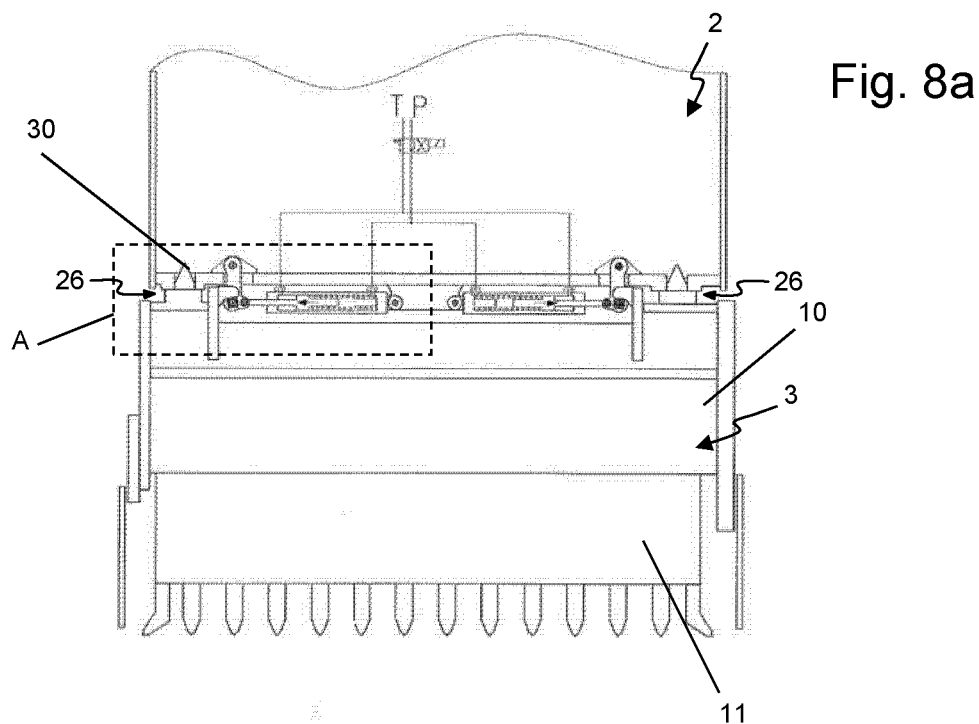
FIG. 8a shows a cross-sectional view of FIG. 2 with the fastening device in the locking position.
Figure 8B:
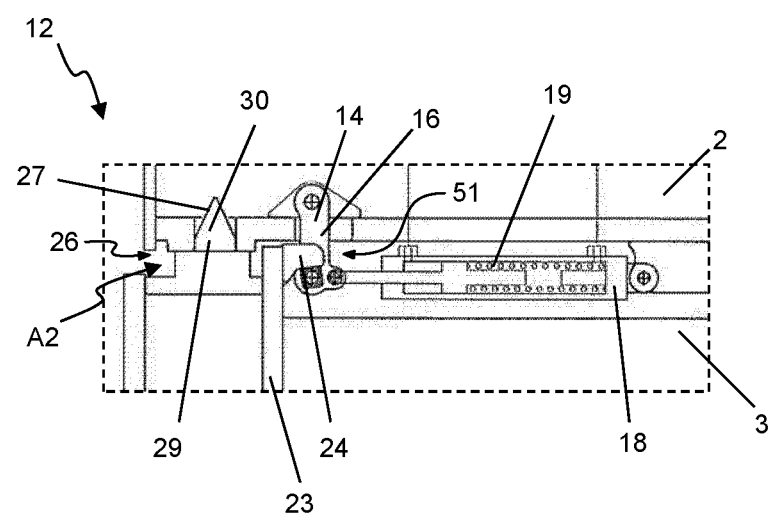

Adjustment of the locking lever 16, or of the locking element 14, from the release position illustrated in FIG. 7b into the locking position illustrated in FIG. 8b is effected automatically, driven by a pressure spring 19 arranged inside a drive element 18. The pressure spring 19 thus pushes the locking lever toward the locking position, and, in other words, acts in the direction of the locking position. For displacing the locking element 14 into the release position according to FIG. 7b, a hydraulic pressure application of the drive element 18 designed as a cylinder-piston unit is effected via a hydraulic circuitry 20 indicated in FIG. 6a by means of a corresponding valve 21. Thus, the overall arrangement ensures that in the case of a missing pressure application, the locking lever 16 automatically takes the locking position according to FIG. 7b driven by the pressure spring 19. Here, the hydraulic cylinder is articulated at the machine frame 2 at the side of the cylinder and at the locking lever 16 at the side of the piston, in each case in a joint-like manner. In the present exemplary embodiment, the drive device is thus entirely arranged at the side of the machine part 2 of the center rotor type milling machine 1.

The fastening device 12 further includes the counter-element 15 which is designed as a fixed holding hook protruding from an upper wall 22 of the milling drum box with a web 23 projecting in the vertical direction and a locking protrusion 24 projecting vertically in a head region of the web 23. Here, the locking protrusion 24 is engaged behind by the locking protrusion 17 of the locking lever 16 for fastening the milling unit 3 to the machine part 2, viewed from the machine part 2, as particularly indicated in FIG. 8b. The stop surface 24' at the locking protrusion 24 for the locking protrusion 17 of the locking lever 16 extends at an angle α inclined to the horizontal plane and declines in the pivoting direction of the locking lever 16 in the direction of the locking position in the vertical direction downward. This ensures that the milling unit 3 is pressed against the machine part 2 in the vertical direction upward, so that the special design of the contact surface 25 with inclination in cooperation with the locking protrusion 17 acts as a clamping device 51 between the milling unit 3 and the machine part 2.

FIGS. 7a and 8a further illustrate that the fastening device 12 overall has two locking elements 14 and counter elements 15 each having one drive element 18 according to the previous description. The engagement or stop positions between the respective locking element 14 and the respective counter element 15 are arranged to be spaced apart from one another as far as possible transversely to the working direction toward the outer sides of the center rotor type milling machine 1. An essential factor is that both drive elements 18 are connected to one another in parallel via the hydraulic circuit 20 and both are actuated via valve 21 simultaneously and at the same effect. The pressure application in the position illustrated in FIG. 7a thus causes a pivoting-in of the two locking levers 16 toward one another. Operation of the fastening device is effected via a suitable switch (not shown in the Figures), for example, in the operator platform 8 and/or laterally at the center rotor type milling machine 1 close to the milling unit 3.

Separately and spaced apart from the fastening device 12, the second alignment device A2 is provided. Said device comprises a hollow-cylindrical receptacle opening 27 or trunnion receptacle at the side of the machine part 2, and, as a counter element at the side of the milling unit 3, the mandrel 28 or trunnion protruding in the direction of the machine part 2, i.e., in the vertical direction, said mandrel or trunnion including a cylindrical base part 29 and a centering cone 30 resting on the base part and tapering upward to become a tip. If, for fastening the milling unit 3 to the machine part 2, the milling unit 3 and the machine part 2 are moved toward one another from the position shown in FIG. 6b into the position shown in FIG. 7b, first the centering cone 30 with its tip gets into the region of the receptacle opening 27. In case of a slight imprecise alignment of the milling unit 3 relative to the machine part 2, the centering cone 30 may slide with its outer surface onto the edge of the receptacle opening 27 and thus cause exact positioning of the milling unit 3 relative to the machine part 2. Thus, in the region of the centering cone 30, there is a clearance for the mandrel 28 in the receptacle opening 27, the clearance becoming smaller along with an increasing alignment movement of the machine part 2 in the direction of the milling unit 3. If now also the cylindrically shaped base part 29 slides into the receptacle opening 27 upon continued insertion movement, a form fit between the outer surface shell of the base part 29 and the inner surface shell of the receptacle opening 27 is achieved, so that a form fit is achieved in the horizontal plane. In the direction of the horizontal plane, the milling unit 3 is positioned relative to the machine part 2 practically without any clearance. This effect is of particular importance since the form fit established by the centering and form fit device 26 of the second alignment device A2 in the direction of the horizontal plane causes a relief of the fastening device 12 in that the latter does not have to ensure a positional securing between the milling unit 3 and the machine part 2. Thus, the fastening device 12 exclusively needs to apply clamping forces in the vertical direction for securing the milling unit 3. The fastening forces to be applied by the fastening device 12 are comparatively low due to this functional separation of the vertical fixation and the horizontal fixation, so that there is no need to configure it in a particularly massive manner and also traction forces to be achieved may be comparatively low. FIGS. 7a and 8a illustrate that the centering and form fit device 26 is also provided multiple times between the milling unit 3 and machine part 2, in the present case two times in the Figures. Furthermore, it is essential that the centering and form fit device 26 in the horizontal plane is spaced apart further outward than the fastening device 12 with respect to the longitudinal center axis in the working direction a. As a result of the largest possible spacing from the outer sides, and thus the largest possible spacing from one another, of the centering and form fit device 26, optimum securing is achieved in the direction of the horizontal plane.

A synopsis of the figures illustrates that a very fast and moreover reliable dismounting and mounting of a milling unit 3 at a center rotor type milling machine 1 will be possible. It is obvious that the specific design and arrangement of, in particular, the alignment devices A1 and A2 may vary, as long as the above mentioned effects are achieved. For example, the arrangement of individual elements of the respective alignment devices A1 and/or A2 at the machine frame and at the milling unit 3 can be effected vice versa. It may be provided as well that the wedge surfaces are designed as extending toward one another against the forward direction of advance of the machine. Furthermore, the specific design of the fastening device may vary. Thus, such variants are, in particular, also comprised by the present invention in which the milling unit is connected to the machine frame via known screw bolt connections. However, in particular, with regard to the operational comfort and in view of the shortened exchange time, an automatically actuatable fastening device is preferred.

While the present invention has been illustrated by description of various embodiments and while those embodiments have been described in considerable detail, it is not the intention of Applicant to restrict or in any way limit the scope of the appended claims to such details. Additional advantages and modifications will readily appear to those skilled in the art. The present invention in its broader aspects is therefore not limited to the specific details and illustrative examples shown and described. Accordingly, departures may be made from such details without departing from the spirit or scope of Applicant's invention.

What is claimed is:

1. A method for dismounting and mounting a milling unit of a center rotor type milling machine, comprising the steps for dismounting the milling unit:
   a) positioning the center rotor type milling machine in an exchange position of the center rotor type milling machine with height-adjustable lifting columns extended in a transport adjustment position;
   b) further lifting a machine frame of the center rotor type milling machine carrying a milling unit by extending the lifting columns being in the transport adjustment position into an exchange adjustment position;
   c) positioning a transport unit relative to the center rotor type milling machine with the milling unit;
   d) placing the milling unit on the transport unit by lowering the milling unit by retracting the lifting columns from the exchange adjustment position until the milling unit rests on the transport unit, and releasing support and functional connections with the machine frame of the center rotor type milling machine;
   e) removing the transport unit with the milling unit;
   and comprising the steps for mounting the milling unit:
   f) extending the lifting columns being in the transport adjustment position into an exchange adjustment position and positioning a transport unit with a milling unit relative to the center rotor type milling machine without milling unit;
   g) establishing support connections;
   h) removing the transport unit; and
   i) lowering the machine frame until reaching the transport adjustment position of the lifting columns.

2. The method according to claim 1,
   wherein in steps e) and/or h), first the machine frame is lifted upward up to the exchange adjustment position, and in step g) first the machine frame of the center rotor type milling machine is lowered to the milling unit.

3. The method according to claim 1,
   wherein movement of the center rotor type milling machine relative to the transport unit is effected in at least one of steps c), e), f) and/or h) by moving the center rotor type milling machine and/or by moving the transport unit.

4. The method according to claim 3,
wherein the transport unit is slid laterally under the machine frame or pulled laterally away from the machine frame of the center rotor type milling machine.

5. The method according to claim 3,
wherein movement of the center rotor type milling machine is effected in or against a forward direction of advance of the center rotor type milling machine.

6. The method according to claim 1,
wherein in at least one of steps c) and/or h) the center rotor type milling machine at least partially over-travels the transport unit.

7. The method according to claim 1,
wherein during extension of the lifting columns being in the transport adjustment position to the exchange adjustment position, an inner part of the lifting column is displaced with a face-sided end into a contact region of an outer part extending in the displacement direction.

8. The method according to claim 1,
wherein in steps f and/or g) alignment of the milling unit relative to the machine frame of the center rotor type milling machine is effected via at least one alignment device at the milling unit and/or at the center rotor type milling machine, to which end the center rotor type milling machine is moved in a self-propelled manner at least partially in or against the forward direction of advance.

9. The method according to claim 1,
wherein establishing the support and/or functional connections in step g) is effected via a quick coupling system which is driven by at least one actuator driven electrically, hydraulically and/or pneumatically.

10. The method according to claim 1,
wherein in step d) lowering of side plates of the milling unit and/or in step h) lifting of side plates of the milling unit is effected by actuation from the center rotor type milling machine via an established functional connection.

11. The method according to claim 1,
wherein steps a) to i) are effected on a standing surface which is essentially horizontal.

12. The method according to claim 1,
wherein steps f and/or g) comprise the following steps:
a) rough alignment of the milling unit relative to the machine frame with a first alignment device; and
b) fine alignment of the milling unit relative to the machine frame with a second alignment device.

13. A center rotor type milling machine, comprising:
a machine frame;
a drive engine;
travelling devices driven by the drive engine and connected to the machine frame via height-adjustable lifting columns; and
a milling unit comprising a milling drum for milling ground material and a milling drum box for covering the milling drum toward sides and upward, the milling unit being fastened in a detachable manner to the machine frame of the center rotor type milling machine via a fastening device,
wherein a control unit is provided which is configured to comprise a milling unit mounting and dismounting mode or exchange mode, in which it controls extending of the lifting columns beyond a transport adjustment position and into an exchange adjustment position.

14. The center rotor type milling machine according to claim 13,
wherein the control unit is configured such that it permits only a limited travelling operation during the milling unit exchange mode with respect to a maximum travelling speed and/or a maximum travelling path of the center rotor type milling machine.

15. The center rotor type milling machine according to claim 13,
wherein a position and/or tilt sensor is provided which transmits information regarding a tilt stability of the center rotor type milling machine to the control unit during the milling unit exchange mode, and a safety function controlled by the control unit is provided which is triggered when predetermined thresholds are reached.

16. The center rotor type milling machine according to claim 13,
wherein the lifting columns each comprise an inner part and an outer part which can be displaced relative to one another and abut one another in a contact region, and the control unit is configured such that, in the exchange mode, the inner part can be displaced with its face-sided end into the contact region.

17. The center rotor type milling machine according to claim 16,
wherein a lubrication groove is provided in the outer part in the contact region, and in that the control unit is configured such that it enables a maximum displacement of the face-sided inner part into the contact region until just before the lubrication groove.

18. The center rotor type milling machine according to claim 13,
wherein a first and a second alignment device are provided which are configured for alignment of the milling unit relative to the machine frame for fastening the milling unit to the machine frame, the first and second alignment devices having different configurations.

19. The center rotor type milling machine according to claim 13,
wherein the milling drum box is connected to the machine frame via a quick coupling system which can be locked and unlocked and which can be actuated from an operator platform, and/or in that a connection block for simultaneous connection of multiple fluid and/or supply connections is provided between the milling unit and the center rotor type milling machine.

20. A transport unit for use in a method according to claim 1,
wherein the transport unit comprises at least one support device for receiving and holding the milling unit.

21. The transport unit according to claim 20,
wherein the transport unit comprises a detachable fastening device for a swap body vehicle having a hydraulically displaceable load arm.

* * * * *